(12) United States Patent
Sayers

(10) Patent No.: US 11,510,392 B2
(45) Date of Patent: Nov. 29, 2022

(54) FLOW-CONTROLLED PET WATER FOUNTAIN

(71) Applicant: Radio Systems Corporation, Knoxville, TN (US)

(72) Inventor: Kevin M. Sayers, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 264 days.

(21) Appl. No.: 15/987,251

(22) Filed: May 23, 2018

(65) Prior Publication Data

US 2018/0338470 A1 Nov. 29, 2018

Related U.S. Application Data

(60) Provisional application No. 62/509,791, filed on May 23, 2017.

(51) Int. Cl.
*A01K 7/02* (2006.01)

(52) U.S. Cl.
CPC ............... *A01K 7/02* (2013.01); *A01K 7/022* (2013.01)

(58) Field of Classification Search
CPC ............. A01K 7/00; A01K 7/02; A01K 7/022
USPC .............................................. 119/72, 74, 76
See application file for complete search history.

(56) References Cited

U.S. PATENT DOCUMENTS

| | | | |
|---|---|---|---|
| 1,278,285 A | 9/1918 | Allen et al. | |
| 1,481,365 A | 1/1924 | William et al. | |
| 2,034,968 A | 3/1936 | Bartlett et al. | |
| 2,103,653 A | 12/1937 | Weil et al. | |
| 2,366,766 A | 1/1945 | Charles et al. | |
| 2,510,212 A | 6/1950 | Donnell | |
| 2,510,252 A | 6/1950 | Morton et al. | |

(Continued)

FOREIGN PATENT DOCUMENTS

| AU | 2014334919 B2 | 2/2017 |
|---|---|---|
| CA | 682630 A | 3/1964 |

(Continued)

OTHER PUBLICATIONS

Amendment Filed on Apr. 9, 2016 for Non-final Office Action dated Feb. 1, 2016 for U.S. Appl. No. 14/308,191, filed Jun. 18, 2014, 42 pages.

(Continued)

*Primary Examiner* — David J Parsley
(74) *Attorney, Agent, or Firm* — Baker, Donelson, Bearman, Caldwell & Berkowitz, PC

(57) ABSTRACT

A flow-controlled pet watering fountain and method of use, thereof, is disclosed. The watering fountain utilizes a pump to direct water up a lift pipe and into a reservoir, whereupon the drinking water falls gravitationally into a drinking basin. Further, the watering fountain allows for control of water flow by selectively opening and closing a flow control valve that is located above the pump and along the water lift pipe. In its open position, the flow control valve allows water to fall back into an interior basin by diverting the flow of water into a return pipe. This arrangement helps prevent premature failure of the pump by allowing the pump to run under substantially the same load and without reducing the total water cycles through the filters. The watering device also allows the water flow from the spout to be completely turned off.

13 Claims, 10 Drawing Sheets

(56) References Cited

U.S. PATENT DOCUMENTS

| | | |
|---|---|---|
| 2,510,446 A | 6/1950 | Weil et al. |
| 2,572,379 A | 10/1951 | Jeffery et al. |
| 2,678,630 A | 5/1954 | Frederiksen et al. |
| 2,726,636 A | 12/1955 | Frederiksen et al. |
| 2,775,227 A | 12/1956 | Henry et al. |
| 2,878,781 A | 3/1959 | Otto et al. |
| 3,061,036 A | 10/1962 | Barton et al. |
| 3,179,085 A | 4/1965 | Mckillip, Jr. |
| 3,228,377 A | 1/1966 | Vincent et al. |
| 3,272,181 A | 9/1966 | Ramsey et al. |
| 3,459,159 A | 8/1969 | Reed et al. |
| 3,505,978 A | 4/1970 | Nilsen et al. |
| 3,537,430 A | 11/1970 | Peppler et al. |
| 3,777,714 A | 12/1973 | Danielsson et al. |
| 3,831,558 A | 8/1974 | Forbes et al. |
| 3,853,429 A | 12/1974 | Wiedenmann et al. |
| 3,868,926 A | 3/1975 | Olde et al. |
| 3,897,753 A | 8/1975 | Lee et al. |
| 3,901,191 A | 8/1975 | Smith et al. |
| 3,903,845 A | 9/1975 | Little et al. |
| 3,920,224 A | 11/1975 | Fassauer et al. |
| 3,979,055 A | 9/1976 | Fathauer et al. |
| 4,022,159 A | 5/1977 | Salvia et al. |
| 4,098,229 A | 7/1978 | Haynes et al. |
| 4,248,177 A | 2/1981 | Peterson et al. |
| 4,347,809 A | 9/1982 | Gloeggler et al. |
| 4,386,582 A | 6/1983 | Adsit et al. |
| 4,463,706 A | 8/1984 | Meister et al. |
| 4,469,049 A | 9/1984 | Waynick et al. |
| 4,512,885 A | 4/1985 | Willinger et al. |
| 4,573,433 A | 3/1986 | Thompson et al. |
| 4,584,966 A | 4/1986 | Moore et al. |
| 4,705,216 A | 11/1987 | Kaffka et al. |
| 4,735,171 A | 4/1988 | Essex et al. |
| 4,747,538 A | 5/1988 | Dunn et al. |
| 4,782,790 A | 11/1988 | Batson et al. |
| 4,807,565 A | 2/1989 | Hawthorne et al. |
| 4,836,142 A | 6/1989 | Duback et al. |
| 4,924,812 A | 5/1990 | Bernays, Jr. et al. |
| 4,976,220 A | 12/1990 | Gershman et al. |
| 4,979,670 A | 12/1990 | Konle |
| 4,993,364 A | 2/1991 | Hessenauer |
| 5,052,343 A | 10/1991 | Sushelnitski et al. |
| 5,122,274 A | 6/1992 | Heskett |
| 5,135,654 A | 8/1992 | Heskett |
| 5,149,437 A | 9/1992 | Wilkinson et al. |
| 5,167,368 A | 12/1992 | Nash et al. |
| 5,198,118 A | 3/1993 | Heskett |
| 5,247,963 A | 9/1993 | Hostetler et al. |
| 5,269,919 A | 12/1993 | Von Medlin |
| 5,269,932 A | 12/1993 | Heskett |
| 5,275,737 A | 1/1994 | Heskett |
| 5,314,623 A | 5/1994 | Heskett |
| 5,329,876 A | 7/1994 | Tracy et al. |
| D350,842 S | 9/1994 | Vanskiver |
| 5,349,925 A | 9/1994 | Zerato et al. |
| 5,369,032 A | 11/1994 | Pratt et al. |
| 5,415,770 A | 5/1995 | Heskett |
| 5,433,171 A | 7/1995 | Ewell et al. |
| 5,433,856 A | 7/1995 | Heskett |
| 5,483,923 A | 1/1996 | Sabbara |
| D367,735 S | 3/1996 | Vanskiver et al. |
| 5,501,178 A | 3/1996 | Kemp et al. |
| 5,510,034 A | 4/1996 | Heskett |
| D374,516 S | 10/1996 | Lillelund et al. |
| 5,599,454 A | 2/1997 | Heskett |
| 5,637,361 A | 6/1997 | Scheurich et al. |
| D383,797 S | 9/1997 | Finnegan |
| 5,778,820 A | 7/1998 | Van Der Lely et al. |
| 5,799,609 A | 9/1998 | Burns et al. |
| 5,833,859 A | 11/1998 | Heskett |
| 5,837,134 A | 11/1998 | Heskett |
| D402,425 S | 12/1998 | Lacz et al. |
| 5,842,437 A | 12/1998 | Burns et al. |
| 5,934,223 A | 8/1999 | Ellery-Guy |
| 5,951,869 A | 9/1999 | Heskett |
| 5,992,349 A | 11/1999 | Sachs et al. |
| 6,044,795 A | 4/2000 | Matsuura et al. |
| 6,055,934 A | 5/2000 | Burns et al. |
| D428,217 S | 7/2000 | Rodack et al. |
| 6,132,612 A | 10/2000 | Bourgeois |
| 6,135,056 A | 10/2000 | Kuo et al. |
| 6,149,070 A | 11/2000 | Hones et al. |
| D435,321 S | 12/2000 | Avila |
| 6,197,204 B1 | 3/2001 | Heskett |
| 6,257,560 B1 | 7/2001 | Kim et al. |
| 6,367,417 B1 | 4/2002 | Gal et al. |
| D457,692 S | 5/2002 | Skurdalsvold et al. |
| 6,401,657 B1 | 6/2002 | Krishnamurthy et al. |
| 6,460,483 B1 | 10/2002 | Northrop et al. |
| 6,467,428 B1 | 10/2002 | Andrisin et al. |
| 6,526,916 B1 | 3/2003 | Perlsweig et al. |
| 6,622,657 B2 | 9/2003 | Northrop et al. |
| 6,651,591 B1 | 11/2003 | Chelen |
| 6,651,592 B2 | 11/2003 | Maddox et al. |
| 6,655,934 B2 | 12/2003 | Mittelstein et al. |
| 6,672,253 B1 | 1/2004 | Viola |
| 6,694,916 B1 | 2/2004 | Rucker et al. |
| D490,577 S | 5/2004 | Steinbacher et al. |
| 6,733,356 B2 | 5/2004 | Lee |
| 6,748,669 B1 | 6/2004 | Burgess et al. |
| 6,748,699 B2 | 6/2004 | Taylor |
| 6,792,891 B1 | 9/2004 | Coburn et al. |
| 6,845,735 B1 | 1/2005 | Northrop et al. |
| D503,247 S | 3/2005 | Ross et al. |
| 6,863,025 B2 | 3/2005 | Ness et al. |
| D506,352 S | 6/2005 | Dow et al. |
| D507,755 S | 7/2005 | Reitze et al. |
| D513,930 S | 1/2006 | Novi et al. |
| 6,983,722 B2 | 1/2006 | Tepper et al. |
| 6,988,465 B2 | 1/2006 | Park et al. |
| 6,990,927 B2 | 1/2006 | Axelrod |
| 7,021,556 B2 | 4/2006 | Muir et al. |
| 7,040,249 B1 | 5/2006 | Mushen et al. |
| D522,807 S | 6/2006 | Dow et al. |
| D527,224 S | 8/2006 | Roth et al. |
| 7,089,881 B2 | 8/2006 | Plante et al. |
| D527,951 S | 9/2006 | Roth et al. |
| D527,954 S | 9/2006 | Roth et al. |
| 7,124,707 B1 | 10/2006 | Clarke |
| 7,146,930 B1 | 12/2006 | Ness et al. |
| 7,156,994 B1 | 1/2007 | Archer |
| D538,041 S | 3/2007 | Reitze et al. |
| 7,198,005 B2 | 4/2007 | Polimeni, Jr. et al. |
| 7,228,816 B2 | 6/2007 | Turner et al. |
| 7,270,081 B2 | 9/2007 | Park et al. |
| 7,270,082 B2 | 9/2007 | Plante et al. |
| D556,511 S | 12/2007 | Mansfield et al. |
| D558,519 S | 1/2008 | Zemel et al. |
| D559,472 S | 1/2008 | Abinanti et al. |
| D562,074 S | 2/2008 | Mansfield et al. |
| D563,605 S | 3/2008 | Morris et al. |
| D564,286 S | 3/2008 | Zemel et al. |
| 7,380,518 B2 | 6/2008 | Kates et al. |
| 7,389,748 B2 | 6/2008 | Shatoff et al. |
| RE40,430 E | 7/2008 | Markham |
| D572,533 S | 7/2008 | Mansfield et al. |
| 7,395,782 B1 | 7/2008 | Lindsay |
| D574,183 S | 8/2008 | Broom et al. |
| D575,986 S | 9/2008 | Cetera et al. |
| 7,426,901 B2 | 9/2008 | Turner et al. |
| 7,430,988 B2 | 10/2008 | Perlsweig et al. |
| 7,458,336 B2 | 12/2008 | Eu et al. |
| 7,467,603 B2 | 12/2008 | Davies et al. |
| 7,472,785 B2 | 1/2009 | Albright et al. |
| D587,529 S | 3/2009 | Pratt et al. |
| 7,513,216 B2 | 4/2009 | Neckel et al. |
| D596,461 S | 7/2009 | Mansfield et al. |
| D598,224 S | 8/2009 | Zanini et al. |
| 7,624,702 B1 | 12/2009 | Fritz et al. |
| 7,647,894 B2 | 1/2010 | Axelrod et al. |
| 7,757,636 B2 | 7/2010 | Mccallum et al. |
| D621,556 S | 8/2010 | Hewson et al. |
| 7,832,362 B2 | 11/2010 | Deghionno |

(56) References Cited

U.S. PATENT DOCUMENTS

| | | |
|---|---|---|
| D629,974 S | 12/2010 | Northrop et al. |
| 7,849,817 B1 | 12/2010 | Warganich et al. |
| 7,909,003 B2 | 3/2011 | Willinger |
| 7,914,468 B2 | 3/2011 | Shalon et al. |
| D636,539 S | 4/2011 | Montoya et al. |
| 7,918,186 B2 | 4/2011 | Rowe et al. |
| D637,770 S | 5/2011 | Lipscomb et al. |
| 7,946,251 B2 | 5/2011 | Hass |
| 7,958,844 B1 | 6/2011 | Northrop et al. |
| 7,984,694 B2 | 7/2011 | Wu et al. |
| D642,745 S | 8/2011 | Veness et al. |
| D642,746 S | 8/2011 | Weber et al. |
| 7,987,817 B2 | 8/2011 | Johnson et al. |
| 8,011,205 B2 | 9/2011 | Roth et al. |
| 8,011,324 B1 | 9/2011 | Warganich et al. |
| D648,904 S | 11/2011 | Tedaldi et al. |
| D650,861 S | 12/2011 | Chuang et al. |
| 8,100,084 B1 | 1/2012 | Abramson |
| 8,141,521 B2 | 3/2012 | Shatoff et al. |
| 8,146,538 B2 | 4/2012 | Kling et al. |
| 8,153,176 B2 | 4/2012 | Etayo et al. |
| D658,818 S | 5/2012 | Lipscomb et al. |
| D658,819 S | 5/2012 | Lipscomb et al. |
| D659,301 S | 5/2012 | Lipscomb et al. |
| D659,914 S | 5/2012 | Lipscomb et al. |
| 8,166,922 B2 | 5/2012 | Jalbert et al. |
| 8,171,885 B1 | 5/2012 | Northrop et al. |
| 8,225,747 B2 | 7/2012 | Markham et al. |
| D665,134 S | 8/2012 | Lipscomb et al. |
| D665,870 S | 8/2012 | Fang et al. |
| 8,245,665 B2 | 8/2012 | Willett et al. |
| 8,347,817 B1 | 1/2013 | Miller et al. |
| D677,018 S | 2/2013 | Miller et al. |
| 8,367,130 B1 | 2/2013 | Tsengas |
| 8,381,685 B2 | 2/2013 | Lipscomb et al. |
| 8,387,566 B2 | 3/2013 | Graves et al. |
| D681,887 S | 5/2013 | Fang et al. |
| D681,888 S | 5/2013 | Fang et al. |
| 8,436,735 B2 | 5/2013 | Mainini et al. |
| 8,464,664 B1 | 6/2013 | Scheffler |
| D686,783 S | 7/2013 | Pluss et al. |
| 8,474,404 B2 | 7/2013 | Costello |
| 8,511,255 B2 | 8/2013 | Hass et al. |
| 8,516,975 B2 | 8/2013 | Becattini, Jr. et al. |
| 8,516,977 B2 | 8/2013 | Shatoff et al. |
| D689,245 S | 9/2013 | Rowe et al. |
| D692,623 S | 10/2013 | Lipscomb et al. |
| 8,555,814 B2 | 10/2013 | Parks et al. |
| D694,477 S | 11/2013 | Rowe et al. |
| 8,701,595 B2 | 4/2014 | Jin et al. |
| D704,388 S | 5/2014 | Fang et al. |
| D704,389 S | 5/2014 | Fang et al. |
| D704,392 S | 5/2014 | Fang et al. |
| D704,903 S | 5/2014 | Fang et al. |
| 8,714,112 B2 | 5/2014 | Kling et al. |
| D709,655 S | 7/2014 | Lipscomb et al. |
| 8,770,147 B2 | 7/2014 | Rowe et al. |
| 8,776,725 B1 | 7/2014 | Grijalva |
| 8,800,494 B2 | 8/2014 | Lipscomb et al. |
| 8,875,658 B2 | 11/2014 | Anderson et al. |
| 8,893,653 B2 | 11/2014 | Browning et al. |
| 8,904,967 B2 | 12/2014 | Reiss et al. |
| 8,925,485 B2 | 1/2015 | Pu et al. |
| 8,944,006 B2 | 2/2015 | Anderson et al. |
| 8,960,126 B2 | 2/2015 | Lipscomb et al. |
| 9,004,011 B2 | 4/2015 | Foley |
| 9,004,012 B2 | 4/2015 | Taylor |
| 9,060,528 B2 | 6/2015 | Axelrod |
| 9,137,968 B2 * | 9/2015 | Veness .................. C02F 1/00 |
| 9,156,950 B2 | 10/2015 | Garralda et al. |
| 9,260,223 B2 | 2/2016 | Kim et al. |
| 9,295,233 B2 | 3/2016 | Axelrod et al. |
| 9,301,496 B2 | 4/2016 | Reiss et al. |
| 9,339,011 B1 | 5/2016 | Crabtree |
| 2002/0189548 A1 | 12/2002 | Northrop et al. |
| 2002/0195001 A1 | 12/2002 | Hester et al. |
| 2004/0118356 A1 | 6/2004 | Krishnamurthy et al. |
| 2004/0194714 A1 | 10/2004 | Lee |
| 2005/0061252 A1 | 3/2005 | Meeks et al. |
| 2005/0166853 A1 | 8/2005 | Plante et al. |
| 2005/0217591 A1 | 10/2005 | Turner et al. |
| 2005/0284382 A1 | 12/2005 | Stantchev et al. |
| 2006/0011145 A1 | 1/2006 | Kates et al. |
| 2006/0027179 A1 | 2/2006 | Welbourne et al. |
| 2006/0231040 A1 | 10/2006 | Bast et al. |
| 2006/0236948 A1 | 10/2006 | Wechsler et al. |
| 2007/0266959 A1 | 11/2007 | Brooks et al. |
| 2008/0011243 A1 | 1/2008 | Moulton |
| 2008/0058670 A1 | 3/2008 | Mainini et al. |
| 2008/0127904 A1 | 6/2008 | Kling et al. |
| 2008/0190374 A1 | 8/2008 | Farris et al. |
| 2008/0257272 A1 | 10/2008 | Bolda et al. |
| 2008/0264963 A1 | 10/2008 | Teodorescu |
| 2010/0030366 A1 | 2/2010 | Scherer et al. |
| 2010/0089329 A1 | 4/2010 | Lefferson et al. |
| 2010/0132629 A1 | 6/2010 | Jalbert et al. |
| 2010/0147760 A1 | 6/2010 | Leavitt et al. |
| 2011/0017141 A1 | 1/2011 | Hewson et al. |
| 2011/0067638 A1 | 3/2011 | Lipscomb et al. |
| 2011/0139076 A1 | 6/2011 | Pu et al. |
| 2011/0259273 A1 | 10/2011 | Lipscomb et al. |
| 2011/0265726 A1 | 11/2011 | Banuelos |
| 2011/0297090 A1 | 12/2011 | Chamberlain et al. |
| 2011/0297091 A1 | 12/2011 | Chamberlain et al. |
| 2012/0006282 A1 | 1/2012 | Kates |
| 2012/0017839 A1 | 1/2012 | Veness et al. |
| 2012/0137979 A1 | 6/2012 | Lipscomb et al. |
| 2012/0216751 A1 | 8/2012 | Rowe et al. |
| 2012/0325156 A1 | 12/2012 | Abramson |
| 2013/0013104 A1 | 1/2013 | Carelli et al. |
| 2013/0019809 A1 | 1/2013 | Mccallum et al. |
| 2013/0036981 A1 | 2/2013 | Lipscomb et al. |
| 2013/0087102 A1 | 4/2013 | Lipscomb et al. |
| 2013/0092090 A1 | 4/2013 | Mccallum |
| 2013/0174790 A1 * | 7/2013 | Lipscomb ................ A01K 7/00 119/74 |
| 2013/0180458 A1 | 7/2013 | Lipscomb et al. |
| 2013/0199454 A1 | 8/2013 | Lipscomb et al. |
| 2013/0213308 A1 | 8/2013 | Koskey, Jr. |
| 2013/0213872 A1 | 8/2013 | Phelan |
| 2013/0228508 A1 | 9/2013 | Lipscomb et al. |
| 2014/0069341 A1 | 3/2014 | Lipscomb et al. |
| 2014/0076242 A1 | 3/2014 | Ho |
| 2014/0090601 A1 | 4/2014 | Stone et al. |
| 2014/0158209 A1 | 6/2014 | Schiller et al. |
| 2014/0251223 A1 * | 9/2014 | Rowe ...................... A01K 7/00 119/74 |
| 2014/0263423 A1 | 9/2014 | Akdogan et al. |
| 2017/0130432 A1 | 5/2017 | Searcy et al. |

FOREIGN PATENT DOCUMENTS

| | | |
|---|---|---|
| CA | 1325561 C | 12/1993 |
| CN | 1535751 A | 10/2004 |
| CN | 200980971 Y | 11/2007 |
| CN | 201234507 Y | 5/2009 |
| CN | 201959605 U | 9/2011 |
| CN | 202061477 U | 12/2011 |
| CN | 202232489 U | 5/2012 |
| CN | 202285810 U | 7/2012 |
| CN | 202310841 U | 7/2012 |
| CN | 202551860 U | 11/2012 |
| CN | 203985484 U | 12/2014 |
| EP | 0610171 A2 | 8/1994 |
| EP | 0636312 A1 | 2/1995 |
| EP | 1145627 A2 | 10/2001 |
| EP | 1300074 A2 | 4/2003 |
| EP | 1360895 A2 | 11/2003 |
| GB | 2454658 A | 5/2009 |
| JP | H0736686 U | 7/1995 |
| JP | 2599615 Y2 | 9/1999 |
| KR | 20110115696 A | 10/2011 |

(56) References Cited

FOREIGN PATENT DOCUMENTS

| KR | 101127936 B1 | 3/2012 |
|---|---|---|
| WO | WO-03015003 A1 | 2/2003 |

OTHER PUBLICATIONS

Animal Planet Pet Feeder available through Amazon.com, accessed on Jun. 27, 2014, 1 page.
Aspen Automatic Pet Feeder Available through Amazon.com, accessed on Jun. 27, 2014, 1 page.
Australian Patent Examiner's First Report on Patent Application No. 2014334919 dated Dec. 9, 2016, 3 pages.
Auto Pet Feeder Available through www.autopet-feeder.com, accessed on Apr. 24, 2015 and Dec. 26, 2015, 4 pages.
Certificate of Patent Grant from the Australia IP Office for Reciprocal Corresponding Patent No. 2014334919 dated Jun. 2017, 1 page.
Chinese office action for Chinese Application No. 2014800355223 dated Jan. 16, 2017, 15 pages.
CIPO Office Action for CA Application No. 2911406 dated Jun. 13, 2017, 3 pages.
Co-pending Design U.S. Appl. No. 29/448,927, filed Mar. 14, 2013, 3 pages.
Co-pending Design U.S. Appl. No. 29/449,001, filed Mar. 14, 2013, 3 pages.
Crestuff Automatic Portion Control Pet Feeder available through Amazon.com, accessed on Jun. 27, 2014, 1 page.
Ergo Auto Pet Feeder available through Amazon.com, accessed on Apr. 6, 2015, 3 pages.
ETSY website from Ceramic Pet Bowl Artist printed Mar. 26, 2013, 2 pages.
Extended European Search Report for European Application No. 14854865.4 dated Jun. 21, 2017, 15 pages.
Extended European Search Report for European Application No. 17176845.0 dated Oct. 9, 2017, 8 pages.
Gate Feeder available through http://gatefeeder.com, accessed on Apr. 6, 2015, 3 pages.
Gatefeeder Smart Pet Feeder available through http://gatefeeder.com/, accessed on Apr. 20, 2014 and Dec. 26, 2015, 4 pages.
Gizmag, Furbo lets you dispense dog treats from afar, http://www.gizmag.com/furbo-pet-treat-camera/43038/, accessed on Jun. 24, 2016, 3 pages.
INDIEGOGO, https://www.indiegogo.com/projects/furbo-world-s-best-treat-tossing-dog-camera#/, accessed on Jun. 24, 2016, 3 pages.
International Preliminary Report on Patentability for Application No. PCT/US2014/043059 dated Dec. 22, 2015, 11 pages.
International Search Report and Written Opinion for Application No. PCT/US2014/043059 dated Apr. 29, 2015, 13 pages.
KDF Process Media published by Fluid Treatment, Inc., Apr. 2003, 8 pages.
Lusmo Automatic Pet Feeder available through lusmo.com, accessed on Apr. 6, 2015, 9 pages.
Lusmo Automatic Pet Feeder available through www.lusmo.com, accessed on Apr. 20, 2014 and Dec. 26, 2015, 8 pages.
MOTA Automatic Pet Feeder available through www.mota.com, accessed on Apr. 24, 2015 and Dec. 26, 2015, 4 pages.
MOTA Perfect Pet Dinner Automatic Food Feeder available through Walmart, accessed on Apr. 6, 2015, 2 pages.
Non-Final Office Action dated Dec. 9, 2013 for U.S. Appl. No. 13/345,261, filed Jan. 6, 2012, 12 pages.
Non-Final Office Action dated Feb. 1, 2016 for U.S. Appl. No. 14/308,191, filed Jun. 18, 2014, 23 pages.
Notification of Transmittal of International Search Report and Written Opinion of the ISA for Application No. PCT/US2014/043059 dated Apr. 29, 2015, 2 pages.
Partial Supplementary European Search Report for European Application No. 14854865.4 dated Feb. 3, 2017, 7 pages.
Perfect Pet Feeder available through www.perfectpetfeeder.com, accessed on Apr. 20, 2014 and Dec. 26, 2015, 10 pages.
Perfect Petfeeder available through perfectpetfeeder.com/, accessed on Apr. 6, 2015, 9 pages.
Pet mate Infinity Portion Control Pet Feeder available www.amazon.com/Petmate-Infinity-Portion, accessed on Apr. 24, 2015, 2 pages.
Pet Watch Automatic Pet Feeder available through www.amazon.com/watchautomatic-feeder, accessed on Apr. 24, 2015, 5 pages.
Petmate Infinity 5 lb Portion Control Automatic Dog Cat Feeder available through www.amazon.com, accessed on Apr. 6, 2015, 2 pages.
PetNet Automatic Pet Feeder available through www.petnet.io/, accessed on Apr. 20, 2014 and Dec. 26, 2015, 8 pages.
Petnet Pet Feeder available through www.petnet.io, accessed on Apr. 6, 2015, 5 pages.
PetSafe Pet Feeder available through Amazon.com, accessed on Jun. 27, 2014, 1 page.
Petwant Automatic Pet Feeder available through Amazon.com, accessed on Jun. 27, 2014, 1 page.
International Search Report and Written Opinion for Application No. PCT/US2018/34101 dated Aug. 24, 2018, 11 pages.
Super Feeder available through super-feeder.com, accessed on Apr. 6, 2015, 6 pages.
Super-Feeder Programmable Pet Feeder available through www.super-feeder.com, accessed on Apr. 20, 2014 and Dec. 26, 2015, 9 pages.
Watch Automatic Pet Feeder available through Amazon.com, accessed on Apr. 6, 2015, 5 pages.
Extended European Search Report for European Application No. 18806101.4 dated Oct. 7, 2020, 7 pages.
International Search Report and Written Opinion for Application No. PCT/US2019/049707 dated Oct. 29, 2019, 6 pages.
DesulfurizationTechnology, edited by the Chinese Society of Environmental Sciences, Beijing, China Environmental Science Press, Nov. 1995, p. 201.

\* cited by examiner

FLOW-CONTROLLED PET WATER FOUNTAIN

CROSS REFERENCE TO RELATED APPLICATIONS

This application claims the benefit of U.S. Provisional Patent Application Ser. No. 62/509,791 filed May 23, 2017 and entitled Flow-Controlled Pet Water Fountain.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of animal watering devices that utilize a submersible pump. More particularly, the invention relates to watering fountains for domestic pets, wherein the fountains are equipped with a flow-control mechanism to selectively adjust or completely terminate the flow of water from a submersible pump up to a reservoir providing a free-falling water stream.

Technology in the Field of the Invention

Many animals have a preference for drinking flowing water. Flowing water is desirable for animals as it increases interest, encouraging them to drink more fluids. This, in turn, can help reduce problems with the animal's kidneys or urinary tract. Flowing water also improves water taste and quality, as flowing water typically has more dissolved oxygen, which can make the water taste better as well as provide potential health benefits.

Many owners of household pets have recognized that their pets are drawn to running water. Owners have observed, for example, that their dogs like to drink from hoses, streams, or water flowing along a curb. Owners have also observed that their cats like to jump on counters and sinks in order to drink from a running or leaking faucet. Some pet owners even deliberately accommodate such behavior, for example, by letting a hose or faucet drip.

In some instances, pets may engage in undesirable behavior in search of running water. For example, pets may jump up onto kitchen counters or toilet seats or into bath tubs. Owners who do provide running water for their animals may incur significant expense by leaving faucets or hoses running.

To address the desire and/or need that pets have, pet fountains have been developed that provide a free-falling water stream. For example, Veterinary Ventures, Inc., of Reno, Nev. offers several pet fountains, such as the Drinkwell® and Drinkwell® Big Dog products. These products provide running water that utilize a stream of free falling water, which can help stimulate animals' interest in the fountain as well as enhance water oxygenation.

U.S. Pat. Publ. No. 2014/0251223 and U.S. Pat. No. 8,770,147 (each hereby incorporated by reference) present examples of pet water fountains that offer water circulation in combination with a free-falling water stream. These fountains include a bowl for holding water along with a submersible pump that lifts water up to a reservoir. The water reservoir may offer an elevated spout that dispenses water out into the bowl.

A disadvantage of falling water is an increased sound level that can be bothersome to pet owners. To alleviate this problem, some watering devices employ a water flow-control mechanism to reduce the power of the falling water so that the noise is reduced. In these watering devices, water flow is reduced by decreasing the water pump flow using a knob on the pump. While this does reduce the noise level, the resultant partial water flow through the pump forces the pump to work harder while pumping less water. This also decreases water circulation and reduces total water cycles through the filters. A byproduct is that such pet fountains can experience both less debris removal and early pump failure. Even then, this method of decreasing water pump inlet flow does not produce a complete cessation of the falling water stream and its attendant noise.

Accordingly, a need exists for an easily-maintained animal watering device that provides substantially continuously-moving, filtered, drinking water for animals while also allowing for selective water flow control that does not adversely affect the small water pump.

BRIEF SUMMARY OF THE INVENTION

An animal watering fountain is provided herein. In one embodiment, the animal watering fountain includes a bowl. The bowl defines a basin with a radial wall for holding an aqueous drinking fluid. The bowl is divided into a portion for drinking (a drinking basin) and a portion that is covered (an interior basin). The interior basin is not accessible to a pet.

The watering fountain also has a housing. The housing resides substantially within the bowl and serves to divide the bowl into its drinking basin and its interior basin. The housing further includes at least one port that serves as an inlet port. The inlet port may be grated, and provides fluid communication between the drinking basin and the interior basin.

In one aspect, the housing is detachable and may include both an inlet port and an outlet port. In one embodiment, the bowl may include a bottom surface that is sloped downward away from the outlet port to facilitate the circulation of drinking fluid around the bowl.

The watering fountain further includes a reservoir. The reservoir is disposed above the bowl and is configured to hold a portion of the drinking fluid. Preferably, the reservoir is integral to the housing.

The watering fountain also includes a submersible pump. The submersible pump is configured to receive the drinking fluid from the interior basin (after it travels through the inlet port), and push the drinking fluid under pressure up to the reservoir.

The reservoir may include a lip. The lip is dimensioned and arranged to deliver drinking fluid from the reservoir back into the drinking basin of the bowl at a splash location. In one aspect, the lip actually extends several inches over the drinking basin. The lip may be a spout, a weir or a delivery tube. Preferably, the watering fountain includes a splash ramp for receiving water falling down from the lip.

The watering fountain further provides a flow-control valve. The flow-control valve resides between the submersible pump and the reservoir and provides for control of return fluid flow, wherein the return fluid flow may be selectively directed to (i) the reservoir, (ii) the return pipe, or (iii) combinations thereof.

In one aspect, the valve includes a pipe system having a lift pipe and a return pipe. The lift pipe directs drinking fluid from the pump up to the reservoir, and the return pipe directs drinking fluid back to the interior basin without reaching the reservoir. The valve further includes a flow-control tube disposed vertically within the lift pipe.

The flow-control tube is rotatable within the lift tube and serves as a valve for directing water received from the pump. In one aspect, the flow-control tube (or other valve) may be oriented in various positions to affect the flow of water to the reservoir. When the flow-control tube is in a completely closed position, the entire volume of drinking fluid flows through the lift pipe and up into the reservoir. However, when in a completely open position, the flow of drinking fluid to the reservoir is turned off, and the entire volume of drinking fluid is directed to the return pipe. The flow control tube also includes a plurality of intermediate positions, wherein the total volume of drinking fluid that reaches the reservoir is reduced by directing a portion of drinking fluid to the return pipe. In this instance, the flow-control tube controls the intensity of the fluid entering the reservoir by thieving a volume of fluid from the lift pipe and re-directing the thieved fluid to the return pipe, whereupon the drinking fluid is released back into the interior basin.

The animal watering fountain may additionally include a pre-filter. The pre-filter resides in the interior basin adjacent the inlet port and pre-filters the drinking fluid as it circulates towards the pump. A second micro-filter may optionally be offered, which is adjacent to or immediately above the pump, i.e., at a pump outlet.

The animal watering fountain may include a drinking fluid inlet. The drinking fluid inlet is configured to deliver drinking fluid from one or more tanks that reversibly attach to the watering fountain. Each tank may include an end cap with a spring valve. This arrangement is useful as a means of automatically replenishing the water in the water basin due to consumption, evaporation and splashing.

In embodiments with a tank and a spring valve end cap, the interior basin may further include an actuator arm. The actuator arm can be configured to depress the end cap of the tank to allow drinking fluid to flow gravitationally into the interior basin when the tank is reversibly attached to the watering fountain.

In one aspect, the lift pipe comprises a y-tube. The y-tube is configured to direct a first portion of the drinking fluid up to the reservoir, and a second portion of the drinking fluid back to the interior basin. This is done without a valve providing portion control. Preferably, the y-tube is disposed downstream from the flow-control tube.

A method for delivering water to an animal is also disclosed herein. The method utilizes the pet water fountain in accordance with its various embodiments. Specifically, the method employs a fountain having a flow-control feature that allows for regulating the flow of drinking fluid up to the reservoir of the fountain without restricting the flow of fluid through the pump.

The method first includes providing a bowl. The bowl defines a wall forming a basin for holding an aqueous drinking fluid. Preferably, the aqueous drinking fluid is water. Preferably, the wall forms a radial basin. In any event, the bowl is divided into an interior basin and a drinking basin.

The method also includes disposing a housing within the bowl. The housing covers at least a portion of the interior basin, with the drinking basin being disposed outside of the housing. The housing further includes at least one inlet port such that the interior basin and the drinking basin are in fluid communication with one another. The housing holds a submersible pump for moving fluid through the watering fountain.

The housing for the pet water fountain also includes a pipe system. The pipe system includes a lift pipe and a return pipe. The lift pipe directs drinking fluid to the reservoir, while the return pipe re-directs some or all of the drinking fluid from the lift pipe back to the interior basin.

The housing additionally includes a reservoir. When the housing is placed into the bowl, then the reservoir will generally reside above the bowl. The reservoir is configured to hold a portion of the drinking fluid. Preferably, the reservoir is built into the housing. The reservoir offers a lip that is arranged to deliver drinking fluid from the reservoir into the drinking basin of the bowl at a splash location.

The pet water fountain also includes a flow-control valve within the housing. The valve may be a tube that is frictionally and rotatably disposed within or along the lift pipe. The tube may be rotated using a flow control knob to control the intensity of the aqueous fluid entering the reservoir by thieving a volume of fluid from the lift pipe and re-directing the thieved fluid to the return pipe and back into the interior basin.

The method further provides for placing aqueous drinking fluid into the interior basin of the bowl. The drinking fluid is further placed into the reservoir.

The method additionally includes a step of activating the pump. This causes drinking fluid to flow through the lift pipe and into the reservoir such that drinking fluid flows over the lip and gravitationally falls down into the interior basin at the splash location.

The method further provides for orienting the flow-control valve in various positions to affect the flow of water to the reservoir. When the valve is in a completely closed position, the entire volume of drinking fluid flows through the lift pipe and into the reservoir. However, when in a completely open position, the flow of drinking fluid to the reservoir is turned off, and the entire volume of drinking fluid is directed to the return pipe. The flow control valve may also include a plurality of intermediate positions, wherein the total volume of drinking fluid that reaches the reservoir is reduced by directing a portion of drinking fluid to the return pipe.

In one aspect, the flow-control valve is a cylindrical tube having an open region that extends across a portion of a circumference of the valve. The flow-control tube assumes the open position when the open region of the valve is disposed over an inlet to the return pipe. Conversely, the flow-control tube assumes the closed position when the open region of the valve is not disposed over the inlet to the return pipe.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

As used herein, the term "lip" refers to any outlet surface or ledge for delivering an aqueous fluid. Water may be pumped over the lip under low pressure. Alternatively, water may simply gravitationally fall over the lip and back into the basin below.

As used herein, the term "reservoir" refers to any bowl, basin, tubing or channel capable of holding, carrying or transporting water.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

DESCRIPTION OF SELECTED SPECIFIC EMBODIMENTS

Figure 1:
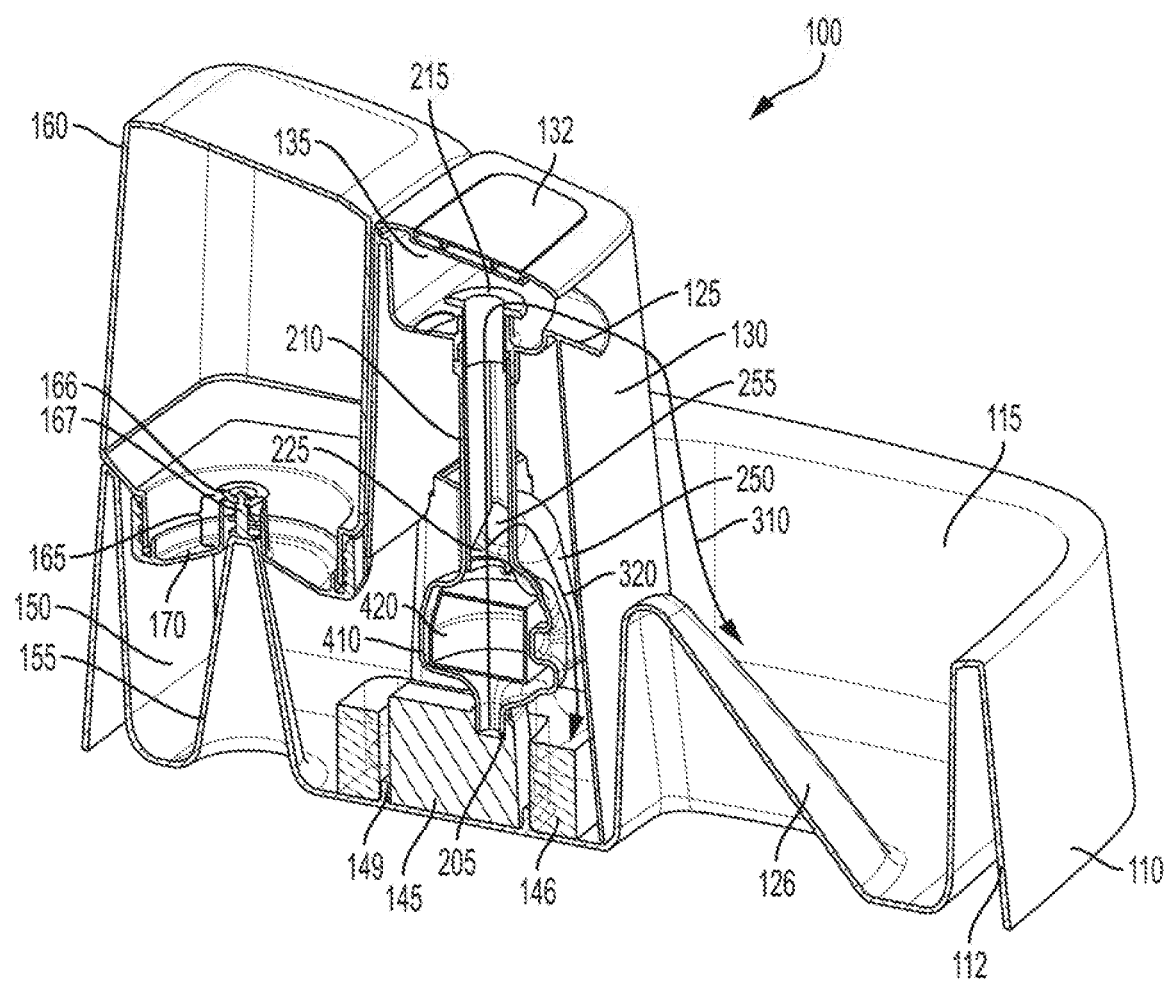
FIG. 1 is a perspective, cross-sectional view of an animal watering fountain of the present invention, in one embodiment. In this configuration, the stream of aqueous fluid exiting the pump is bifurcated, creating a dual flow path.

FIG. 1 is a perspective, cross-sectional view of an animal watering fountain 100 of the present invention, in one embodiment. The view is taken from a left front side of the fountain 100.

As illustrated, the animal watering fountain 100 first has a bowl 110. The bowl 110 defines a radial wall 112. The wall 112 and the bowl 110 are configured to together hold an aqueous drinking fluid 310 for a pet.

The animal watering fountain 100 not only holds an aqueous fluid (such as water), but also circulates that water 310 so that it remains fresh and oxygenated. In addition, the water 310 may be filtered so that it is maintained in a clean or particle-free state. In order to provide the circulation and filtering functions, various components are provided. Those components are generally held within a housing 130. Components of the housing 130 are visible in the cross-sectional view of FIG. 1.

The housing 130 divides the basin into a drinking portion or basin 115 and an interior portion or basin 150. The drinking basin 115 is accessible to an animal at the front of the fountain 100, while the interior basin 150 is located behind and underneath the housing 130 and is not accessible to the animal.

Figure 5:
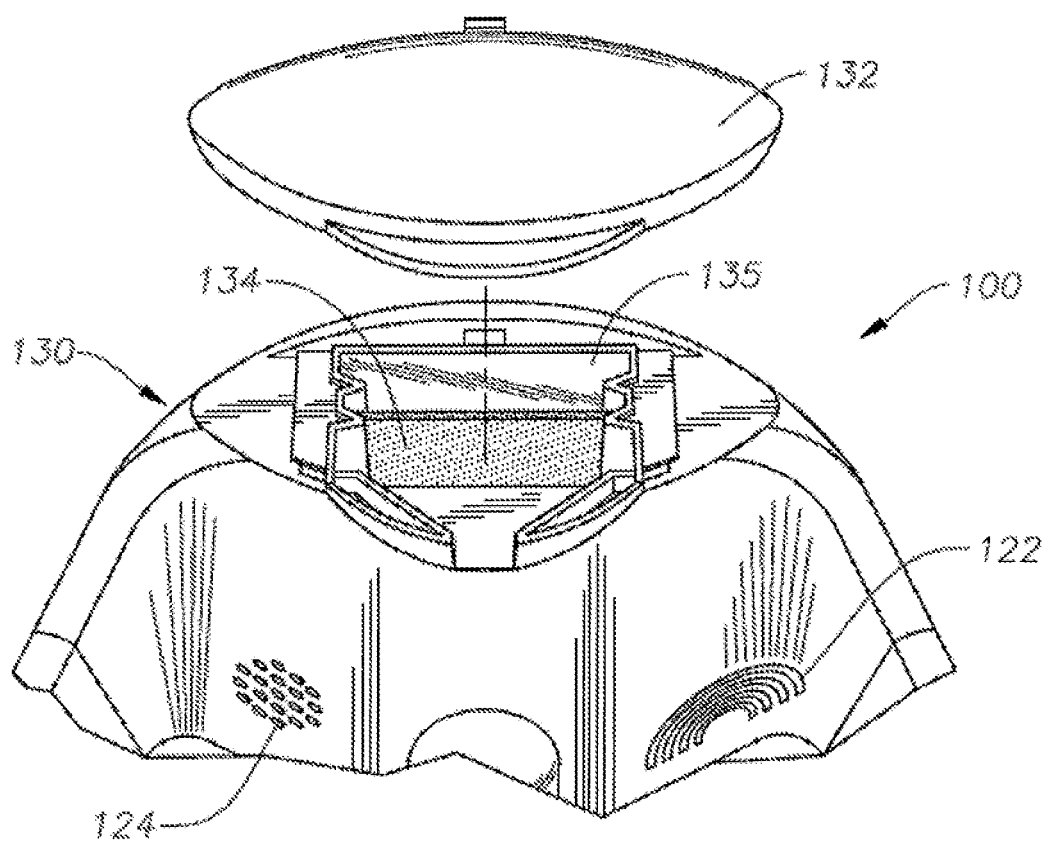
FIG. 5 is a perspective view of a portion of the housing of the animal watering fountain in an alternate embodiment. A cap has been removed from the housing, exposing a reservoir with a filter.
Figure 6:
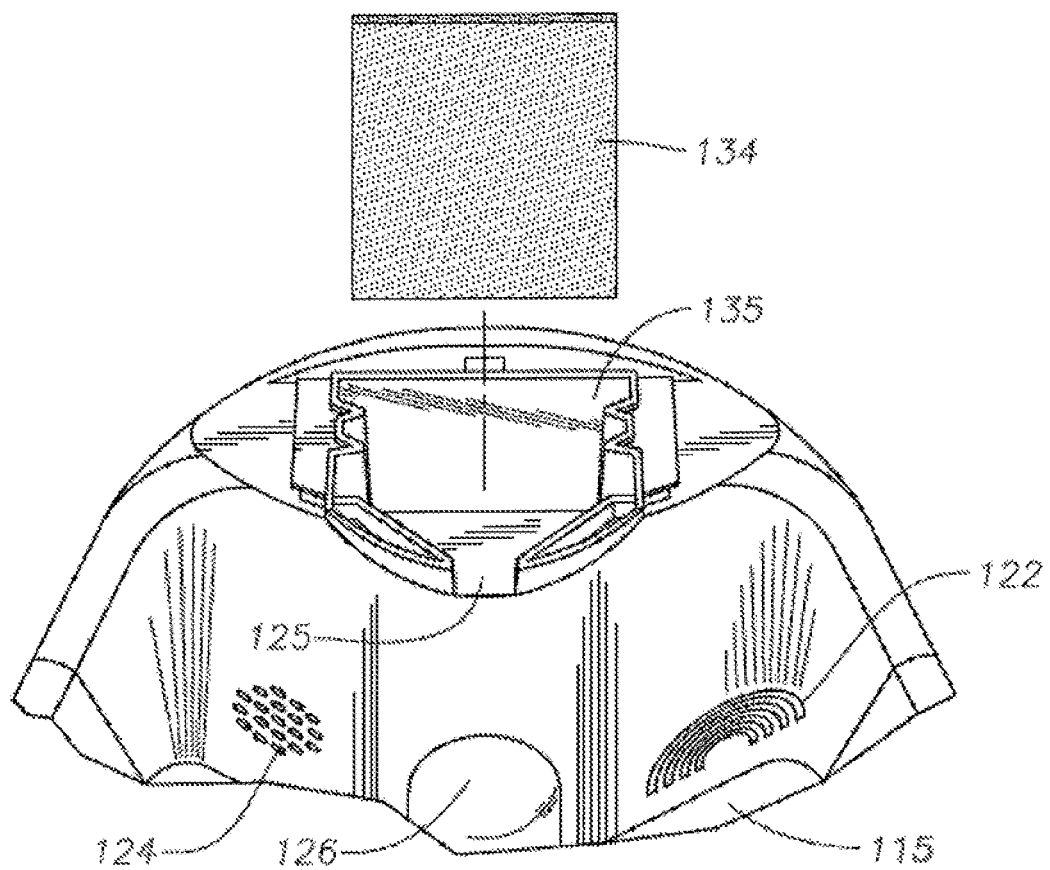
FIG. 6 is another perspective view of the animal watering fountain of FIG. 5. Here, the cap has again been removed from the housing. A filter has further been exploded away from the reservoir for illustrative purposes.

FIGS. 5 and 6 provide perspective views of an illustrative housing 130 for the pet water fountain 100, in one embodiment. A cap 132 has been removed from the housing 130, exposing a reservoir 135 with a filter 134.

In FIG. 5, the filter 134 is residing within the reservoir 135. In FIG. 6, the filter 134 has been exploded away from the housing 130 and above the reservoir 135 for illustrative purposes.

Referring to FIGS. 5 and 6 together, the watering fountain 100 may comprise an inlet port 122 and an outlet port 124. Water is circulated from the drinking basin 130, through the inlet port 122, and to a submersible liquid pump (seen at 145 in FIGS. 1-4 and 7A). The pump 145 optionally circulates a portion of the water through the outlet port 124 and back into the drinking basin 115. During circulation, the aqueous fluid 310 circulates between the drinking basin 115 and the interior basin 150.

In the illustrative arrangement of FIGS. 5 and 6, the inlet port 122 and the outlet port 124 are in the form of grates formed in the housing 130. Water is drawn into the interior basin 150 through the grate for the inlet port 122. A first portion of water may circulated back into the drinking basin 115 through the grate that is the outlet port 124. A second portion of water is pumped into a reservoir 135 and released through a spout opening 125. Water falls from the spout opening 125 and into the drinking basin 115. Preferably, the second portion of water represents at least 75% of a volume of water released by the submersible pump 145.

The filter 134 resides vertically within the reservoir 135. The filter 134 is preferably a non-absorbent charcoal filter. The filter 134 divides the reservoir 135 into two compartments. Water flows from the pump 145 into a first compartment behind the filter 134. The water then flows through the filter 134 and into a second compartment. As water fills the second compartment, it reaches the spout opening 125 of the housing 130. The spout opening 125 thus serves as a lip over which water flows down into the drinking basin 115.

Concerning the housing 130, the housing 130 may be a removable component that snaps in and out of place. The housing 130 is preferably fabricated from a polycarbonate or polystyrene material. Such a plastic material offers a lightweight but durable material that is easily removed and cleaned by a pet owner.

Optionally, a splash ramp 126 is provided above the water level in the drinking basin 115. This keeps water from splattering over the wall 112 and out of the bowl 110. It is observed in FIG. 1 that the splash ramp 126 forms a sloped surface that is angled towards the radial wall 112. Optionally, the splash ramp 126 is an island around which water 310 circulates within the bowl 110.

The animal watering fountain 100 is designed to provide water for an animal (not shown). The animal is ideally a domesticated dog or cat. In operation, the owner fills the drinking basin 115 with aqueous fluid, and then activates the submersible pump 145. The pump 145 propels the aqueous fluid up a lift pipe 210, to a reservoir (seen at 135 in FIGS. 1, 5, and 6), through the spout opening 125, and back into the drinking basin 115.

Preferably, the pump 145 is a submersible pump operating at 50-60 Hz and about 5.2 volts of power. The pump 145 may be, for example, the SP-880 aquarium pump manufactured by Resun™ of Shenzhen, China. In one aspect, the pump 145 pumps up to about 370 liters of fluid per hour. The pump 145 draws water up from the interior basin 150, preferably after the water has been filtered.

As noted, the housing 130 includes a removable cap 132. In FIG. 5, the cap 132 is shown separated from the housing 130, revealing a reservoir 135 within the housing 130. A filter 134 is seen within the reservoir, providing additional filtering (post-pumping) before water falls from the spout 125.

FIG. 6 provides another perspective view of the animal watering fountain 100 of FIG. 1. Here, the cap 132 has been removed from the housing 130 and is not seen. In addition, the filter 134 has been removed from the housing 130. The filter 134 is shown exploded above the housing 130 for illustrative purposes.

As also noted, a pump 145 resides within the housing 130. More specifically, the pump 145 resides within the interior basin portion 150 of the pet water fountain 100. The pump 145 is secured into place by a small boundary wall 149 (seen in FIG. 1) closely surrounding the pump 145. As discussed further in connection with FIGS. 2 and 3 below, the pump 145 comprises an inlet slot 143 that pulls aqueous fluid 310 into the pump 145, and then an outlet 144 that forces the aqueous fluid out of the pump 145 in a generally upward direction.

Figure 2:
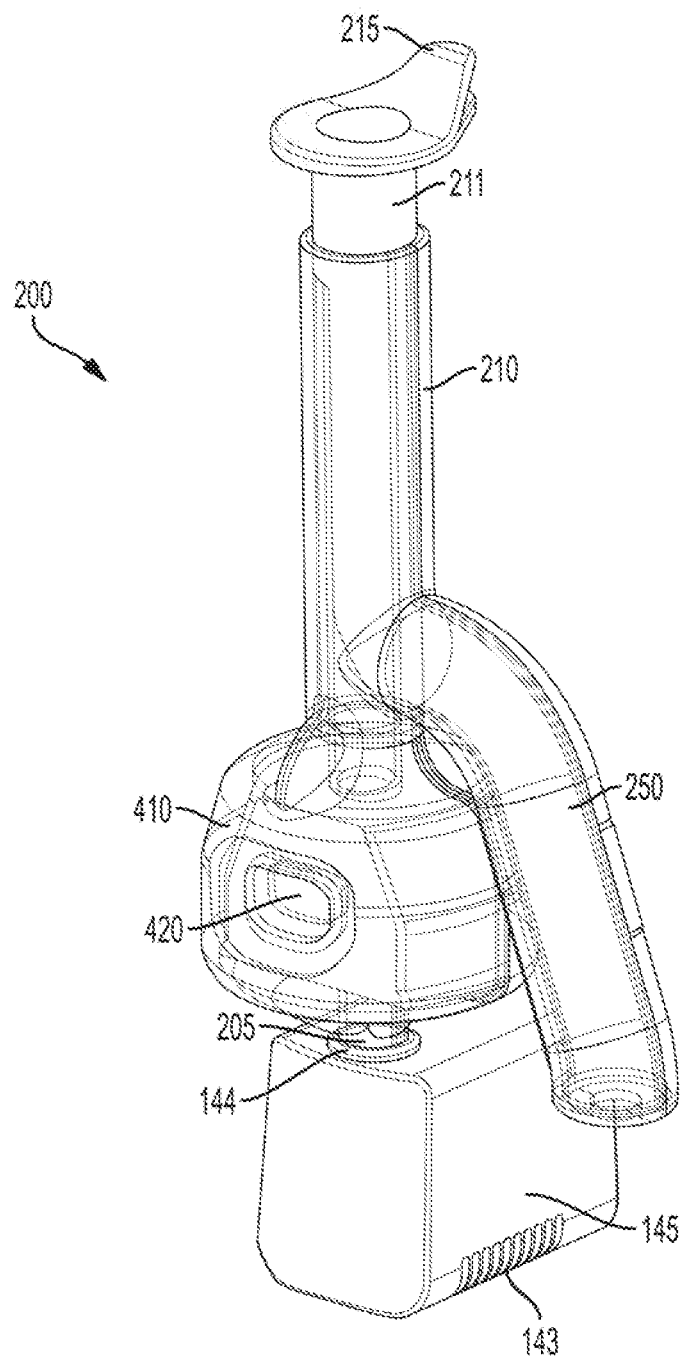
FIG. 2 is a perspective view of the pump, the flow-control tube, the lift pipe, and the return pipe making up the pipe system for the animal watering fountain of FIG. 1.

FIG. 2 is an enlarged perspective view of the pump 145. The pump inlet 143 and the pump outlet 144 are visible. Also seen in FIG. 2 are components of a pipe system configured to receive fluids pumped from the pump outlet 144. These include a lift pipe 210, a flow-control tube 211, and a return pipe 250. Together these components from a valve 200.

Figure 3:
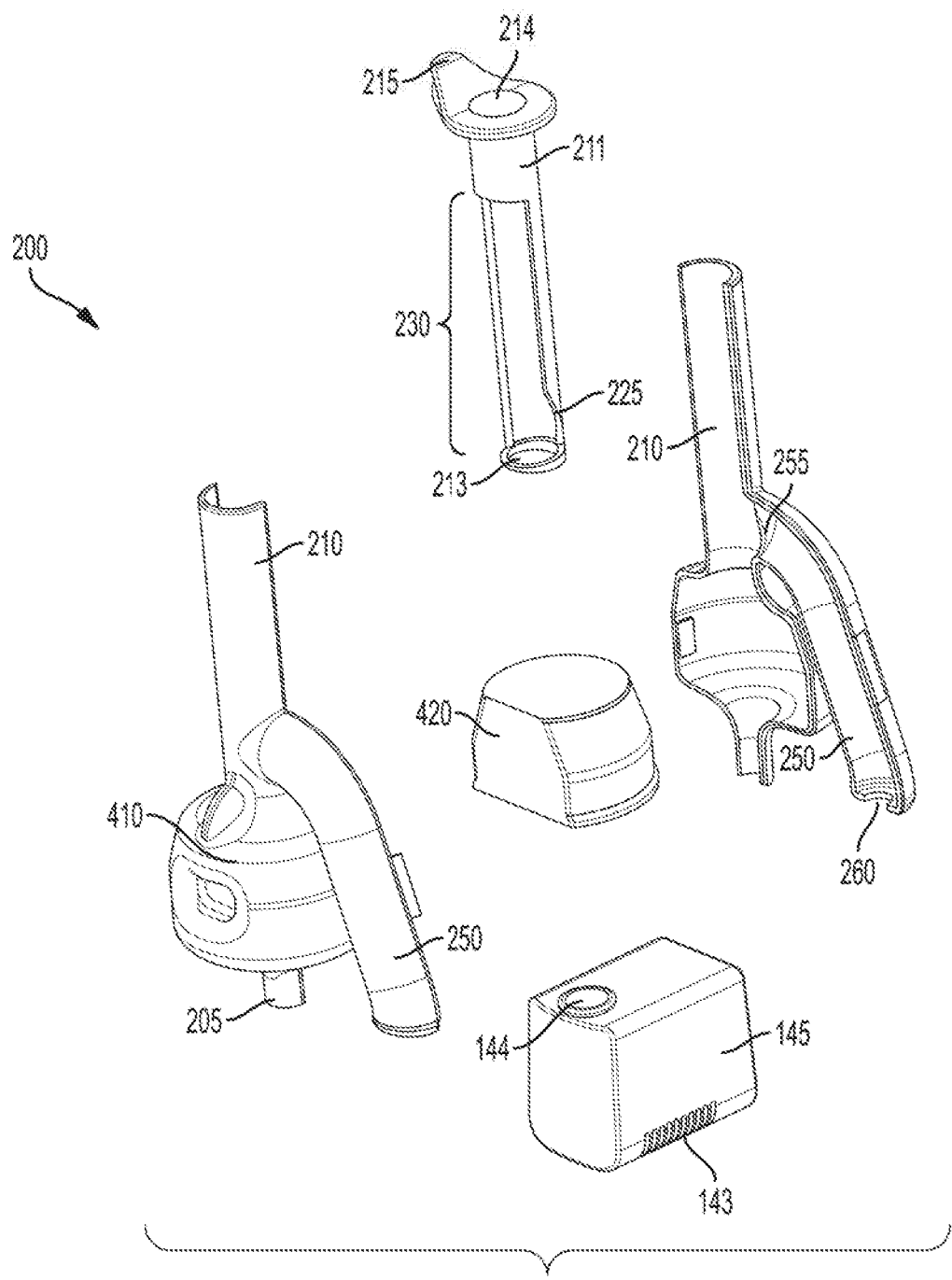
FIG. 3 is an exploded perspective view of the pump, the flow-control tube, the lift pipe, and the return pipe of FIG. 2.

FIG. 3 is an exploded perspective view of the pump 145 and the pipe system components. Visible in FIG. 3 are the pump 145 and its fluid inlet 143 and its fluid outlet 144. Also visible is a stem 205 that connects a housing 410 to fluid outlet 144 via frictional engagement.

In operation, the pump 145 is turned on and propels water from the inlet slot 143 and through the fluid outlet 144. As water 310 is drawn into the pump 145, it is filtered by a foam pre-filter 146. As water 310 exits the pump 145, it travels through the stem 205, where it enters the valve 200.

A cylindrical housing 410 may be disposed between the stem 205 and the valve 200. Within the housing 410 is an optional filter 420. The filter 420 may be, for example, a charcoal filter. More preferably, the filter 420 is a multi-stage filtering device. In one aspect, the multi-stage filtering device includes a first filtering stage representing copper zinc alloy particles, and a second filtering stage representing granulated activated carbon particles.

The copper zinc alloy particles provide a bacteriostatic medium and also act to assist in raising the pH level of the treated water. This serves to "soften" the water during circulation. The alloy may be, for example, KDF 55 available from KDF Fluid Treatment, Inc. of Three Rivers, Mich. Alternatively, the alloy may be KDF 85 also available from KDF Fluid Treatment, Inc. Those of ordinary skill in the art will understand that municipal water supplies can contain calcium, magnesium, or other minerals that make water "hard." Such minerals can form scale and cause a variety of problems in hardware. It is believed that the KDF alloy products will remove these minerals. KDF Fluid Treatment, Inc. has represented that its process media are also non-toxic. Some of the KDF alloy products are promoted as being able to remove mercury as well.

It is observed that other copper alloys may alternatively be used as the first filtering medium. Copper alloys are metal alloys that have copper as their principal component. Copper alloys are known to have a high resistance against corrosion and are frequently used as a material for piping. The first filtering medium may comprise brass particles, which is copper mixed with zinc and also sometimes tin or aluminum. The first filtering medium may alternatively comprise copper-nickel-zinc particles.

It is further observed that the first filtering medium of the filter 420 may include small amounts of salt, such as potassium chloride or sodium chloride. Softening salt pellets are available at many retail outlets. These salts will further act to soften the water during circulation.

In any event, each stage may constitute filtering material that is separated into an array of cells residing along a vertically-oriented frame. Material is optionally placed within a porous coating or cover, and resides within the geometry of each cell of the array. The covers with filtering media are then secured to or otherwise held along their respective cells. In another embodiment, the filtering media are packed in series within a tubular body that is in fluid communication with an inlet or outlet of the pump.

Extending from the housing 410 is the flow-control tube 211. The flow-control tube 211 fits within the lift pipe 210, and is disposed at a vertical location within the pipe system such that it can be manipulated to partially or completely cover an inlet 255 of return pipe 250. A diameter of the flow-control tube 211 is slightly smaller than a diameter of the lift pipe 210. This means that the flow-control tube 211 fits tightly within the lift pipe 210. The flow control tube 211 may be rotated within the lift pipe 210 to direct the flow of fluid 310. If the flow-control tube 211 is rotated to a closed position, the aqueous fluid continues up the lift pipe 210 and empties into the reservoir 135 via an opening 214 on the top of the lift pipe 210. After filling the reservoir 135, the aqueous fluid spills over the lip of a spout 125, which directs the fluid 310 to fall gravitationally into the drinking basin 115. This flow of fluid is depicted as a first flow path in FIGS. 1 and 4a.

The flow-control tube 211 may be rotated within the lift pipe 210 to a completely open position. In this position, none of the pumped fluid 310 reaches the reservoir 135. The stream of fluid spilling out of the reservoir spout 125 is completely stopped and all fluid 310 is directed immediately back into the interior basin 150. This flow of fluid is depicted as a second flow path 320 in FIGS. 1 and 4B. Controlling the fluid flow in this manner allows the pump 145 to continuously maintain the same running load and does not reduce the total water cycles through associated filters 146 and 134 or 146 and 420 depending on the embodiment, even when fluid flow from the reservoir spout 125 is completely turned off. The variable valve 200 selectively determines the flow or flow rate of the fluid between the first flow path and the second flow path.

Returning to FIGS. 2 and 3, the pipe system further comprises a return pipe 250. The return pipe 250 branches off from a bottom portion of the lift pipe 210. At the option of the user, aqueous fluid may be diverted from the lift pipe 210 and into the return pipe 250 by adjustment of the flow-control tube 211 as discussed above. When the flow-control tube 211 is in an open position, as in FIGS. 1 and 4B, fluid 310 is transported from the pump 145, through the valve 200, and enters the return pipe 250 through an inlet port 255. The fluid 310 then moves down the return pipe 250 and exits the return pipe via an outlet 260 to rejoin the fluid 310 in the interior basin 150.

The return pipe 250 may be configured such that the outlet 260 extends below the surface level of the fluid within the interior basin 150. When so configured, the fluid exits the submerged return pipe outlet 260 and flows into the interior basin 150 without creating a splashing noise. Fluid then passes through the outlet port 124 and circulates back into the drinking basin 115.

The flow-control tube 211 may also be used to regulate the amount of aqueous fluid that reaches the reservoir 135. Using the flow-control tube 211, the stream of aqueous fluid 310 that reaches the reservoir 135 and spills back into the drinking basin 115 may be increased, decreased, or turned off completely.

To provide for this selective regulation of flow, a flow knob 215 is provided. FIG. 3 shows that the cylindrical flow-control tube 211 includes a flow knob 215. Turning the flow knob 215 allows the pet owner to selectively rotate the flow-control tube 211, and move the valve 200 between open and closed positions.

A section of the flow-control tube 211 is shown in FIG. 3 as being cut away, revealing a U-shaped region of the tube 211 with a generally open portion 230. The lower end of the tube 211, near an inlet 213, comprises a portion that is further cut away and extends further into the tube 211 from the open portion 230 at an angle, forming a variable opening 225. In one aspect, the open region 225 forms an opening that is substantially isosceles-triangle-shaped.

The flow-control tube 211 may be used to control the intensity of the aqueous fluid 310 falling from lip of the reservoir spout 125. In this respect, the flow-control tube 211 may be set to intermediate positions wherein some portion of the aqueous fluid is diverted through the opening 225 and into the return pipe 250 such that at least a portion of fluid circulates directly back into the interior basin 150 and does not reach reservoir 135. At the same time, some fluid 310 is still allowed to flow up to the reservoir 135 and through the reservoir spout 125. When so disposed within the lift pipe 210, the flow-control tube 211 may be adjusted via the flow-control knob 215, such that the flow-control valve 200 regulates the flow of fluid through the opening 225 and entering the inlet 255 of the return pipe 250.

Figure 4A:
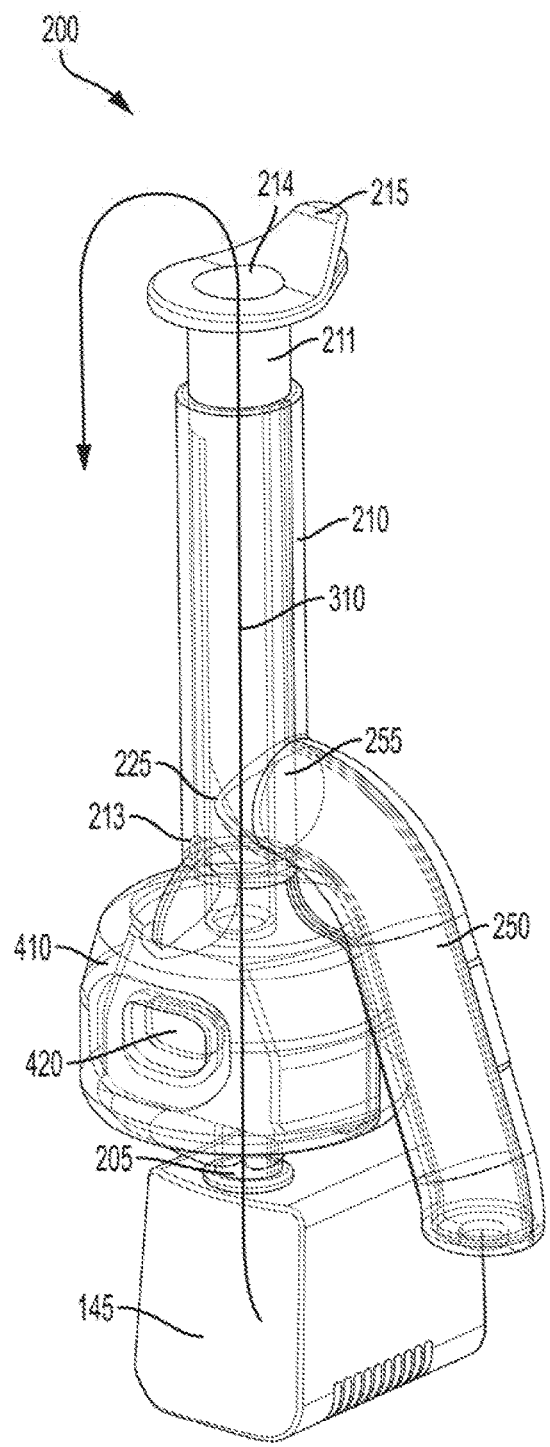
FIG. 4A is a perspective view of the pump and the pipe system for the animal watering fountain of FIG. 1. Here, the flow-control tube is in a closed position, allowing an aqueous fluid to entirely flow up the lift pipe.

FIG. 4A illustrates the flow-control valve 200 in a closed position, completely obstructing the flow of aqueous fluid to the return pipe 250. The opening 225 of the flow-control valve 200 can be seen to the left of the inlet 255 of the return pipe 250. Here, the open portion 230 of the tube 211 is oriented away from the return pipe 250 (hence, the open portion is not visible in FIG. 4A). In this orientation, the closed portion of the flow-control tube 211 covers the inlet 255 of the return pipe 250 and prevents the flow of aqueous fluid 310 into the return pipe 250.

Figure 4B:
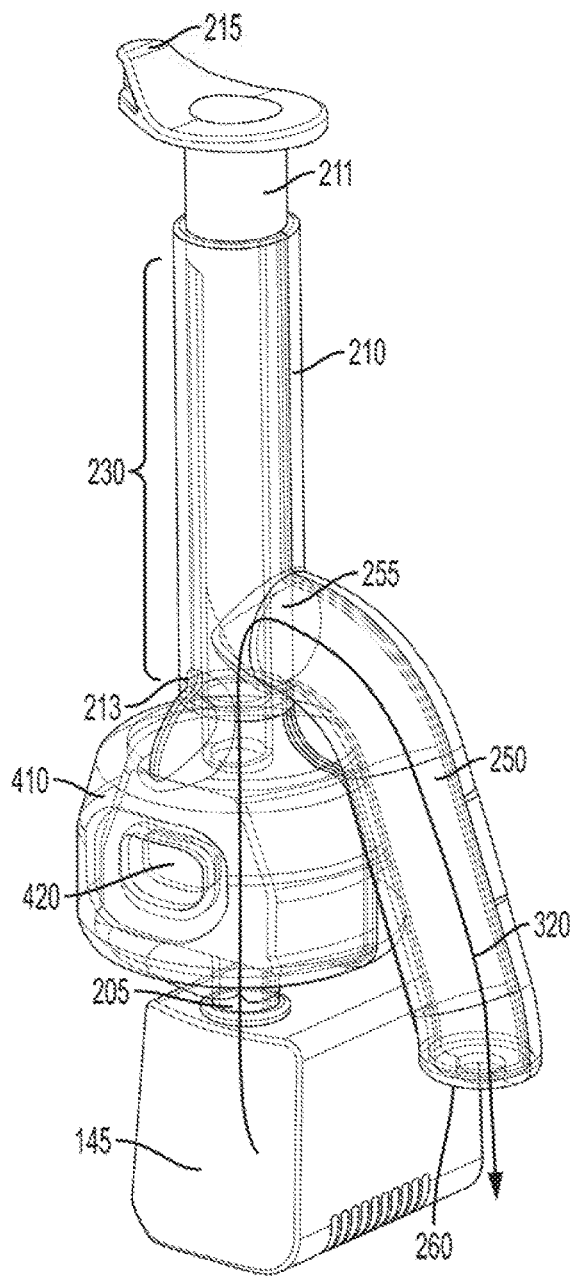
FIG. 4B is another perspective view of the pump and the pipe system for the animal watering fountain of FIG. 1. Here, the flow-control tube has been rotated counter-clockwise 90° as compared to FIG. 4A, which orients the flow-control tube in a fully open position. All of the aqueous fluid is now re-directed to flow through the return pipe.

FIG. 4B illustrates an open position 230 of the valve 200. Here, the flow-control knob 215 within the lift pipe 210 is rotated 90° counter clockwise from the position of FIG. 4A. The open portion 230 of the tube 211 faces the inlet 255 of the return tube 250, while the opening 225 of the flow-control valve 200 is oriented to the right of the return tube inlet 255. In this open orientation wherein the return tube 250 is unobstructed, all of the aqueous fluid 320 is diverted through the opening 225 and into the return tube 250. Consequently, aqueous fluid 310 is not directed to the reservoir 135, and the stream of fluid that otherwise flows out of the reservoir spout 125 and into the drinking basin 115 is turned off completely.

FIG. 1 illustrates the watering fountain 100 with the flow-control tube 211 and its opening 225 in an intermediate position. The opening 225 of the flow-control valve 200 is oriented such that about half of the inlet 255 to the return pipe 250 is covered and about half of the inlet 255 is open. This intermediate orientation bifurcates the stream of aqueous fluid 310 such that a first volume is pumped to the top of the lift pipe and a second volume flows into the return pipe 250, thereby regulating the total amount of aqueous fluid that spills over the reservoir spout 125 and into the drinking basin 115.

As is evident from the discussion above, the valve 200 (and its opening 225) can be set to a fully open position to turn on the falling fluid stream 310, or to a fully closed position to turn off the falling fluid stream 310. In addition, the valve 200 (and its opening 225) can be set to half open and half closed or any other position between open and closed.

It is expected that as the animal drinks from the bowl 110, the water level in the bowl 110 will drop. In addition, normal evaporation will thief some water from the fountain 100. Therefore, it is preferred that an external water source be provided for the fountain 100. Such an external water source may be supplied from a system of one or more tanks 160 that are reversibly attached to the watering device. The one or more tanks 160 may be open at one end, each comprising an end cap 170 that is removably attached to the open end. The end cap may comprise a spring valve system 165 that allows liquid to flow from the tank 160 when the spring valve 167 is depressed.

In operation, an aqueous fluid such as water is poured into the open end of a tank 160, and the end cap 170 is placed over the open end of the tank 160. The open end may be configured to threadably receive a complimentary threaded end cap 170, which is screwed over the open end of the tank. The tank 160 may then be inverted and set into place behind the housing 130. The tank 160 may be configured to rest gravitationally on the radial wall 112 of the bowl 110. The end cap 170 is configured to receive an actuator arm 155, which is depicted in FIG. 1 as a conical-shaped protrusion 155 that extends upward from the interior basin 150. Upon placing the inverted tank 160 on the radial arm 112 of the bowl 110, the actuator arm 155 depresses a spring valve 167 that is embedded into the end cap, lifting a seal 166 and allowing the aqueous fluid 310 to flow gravitationally from the tank 160 into interior basin 150.

Alternatively, the external water source may originate from a typical garden hose. Embodiments employing a water hose comprise threaded inlets and an auto shut-off valve as disclosed in US. Pat. Pub. 2014/0251223, which is incorporated into the present application by reference.

Figure 7A:
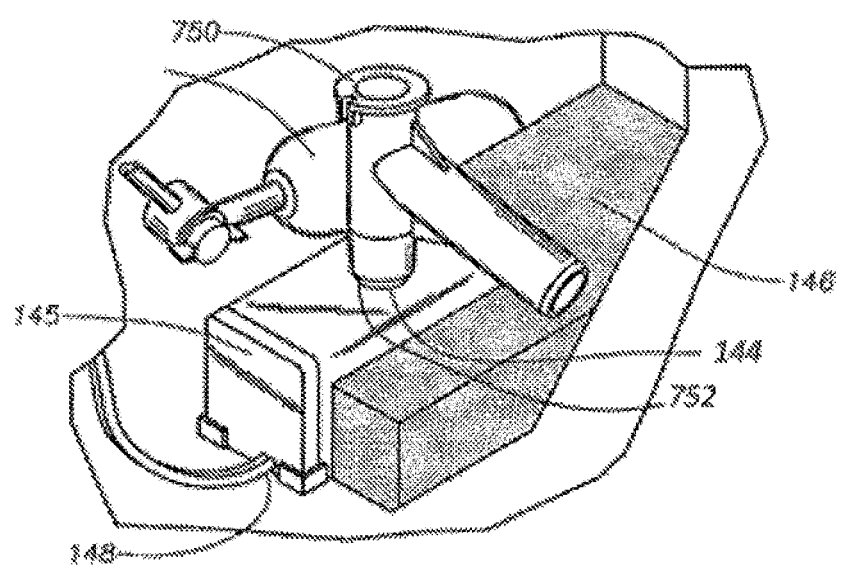
FIG. 7A is a perspective view of a submersible electrical pump and a "y-tube" as may be used in the animal watering fountain of FIG. 1.
Figure 7B:
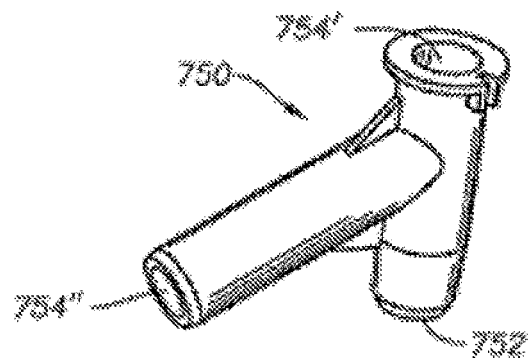
FIG. 7B is a perspective view of just the y-tube of FIG. 7A.
Figure 7C:
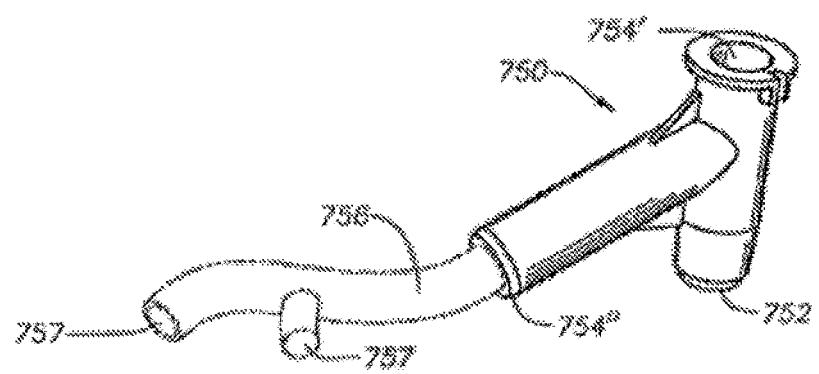
FIG. 7C is another perspective view of the y-tube of FIG. 7B. Here, a tubular extension is provided to one of the outlets.

As shown in FIGS. 7A-7C, the watering fountain may further comprise a y-tube 750 disposed between the pump 145 and the piping system of FIGS. 1-4. The optional y-tube provides increased circulation of the fluid 310 between the interior basin 150 and the drinking basin 115. FIG. 7A is a perspective view of the submersible electrical pump 145 and the connected y-tube 750 that may be incorporated into the watering fountain. The y-tube 750 has an inlet 752 that is shown connected to the outlet 144 on top of the pump 145.

FIG. 7B is a perspective view of just the y-tube 750 of FIG. 7A. Here, it can be seen that the y-tube 750 has an inlet 752. The inlet 752 is frictionally and sealingly engaged with an outlet of the pump 145. The y-tube 750 also has a first outlet 754'. The first outlet 754' delivers water to lift pipe 210 and ultimately to the reservoir 135 of the housing 130. The y-tube 750 further has second outlet 754". The second outlet 754" delivers water to the outlet port 124 of the housing 130 of FIGS. 5 and 6.

It is understood that the y-tube 750 of FIG. 7B is merely illustrative. Other arrangements for providing a split stream of water may be employed. These may include a manifold having tubes.

FIG. 7C is another perspective view of the y-tube 750 of FIG. 7B. Here, a tubular extension 756 is provided to the second outlet 754". The tubular extension 756 offers two or more outlets 757 for directing water within the basin 115 and 150. This further encourages a radial circulation of water in the bowl 110.

The tubular extension 756 having two or more openings 757 may be positioned adjacent to the bottom surface of the water bowl 110 disclosed in FIG. 1 parallel with the sides 112 of the bowl 110. This encourages continual circulation of fluid around the basin 115 and 150, further encouraging the fluid to remain in constant motion. Water re-enters the housing 130 at the inlet port 124 of FIGS. 5 and 6 where it is re-filtered, thus providing a constant flow of clean, filtered water for the animal to drink.

The present invention may also comprise an electrical cord and low-voltage power adapter as disclosed in US. Pat. Pub. 2014/0251223, which is incorporated into the present application by reference. Briefly, the cord may comprise a bite-resistant outer cover that keeps a puppy (or other animal) from being shocked should the animal bite through the cord.

The watering device presented in the figures discussed above is just one embodiment of the invention claimed herein. Other embodiments may be employed without departing from the broader scope and spirit of the present general inventive concept. For example, an agitator can be used to dispense water in a selected direction out of the outlet port 124. In some embodiments, the pump may be powered through solar power or via a battery. In one embodiment, an impeller is placed along the interior basin 115 for urging water to flow from the outlet port 124, around the basin 115, and to the inlet port 124. A drive motor may be employed for mechanically imparting rotational movement to a shaft of the impeller.

Figure 8:
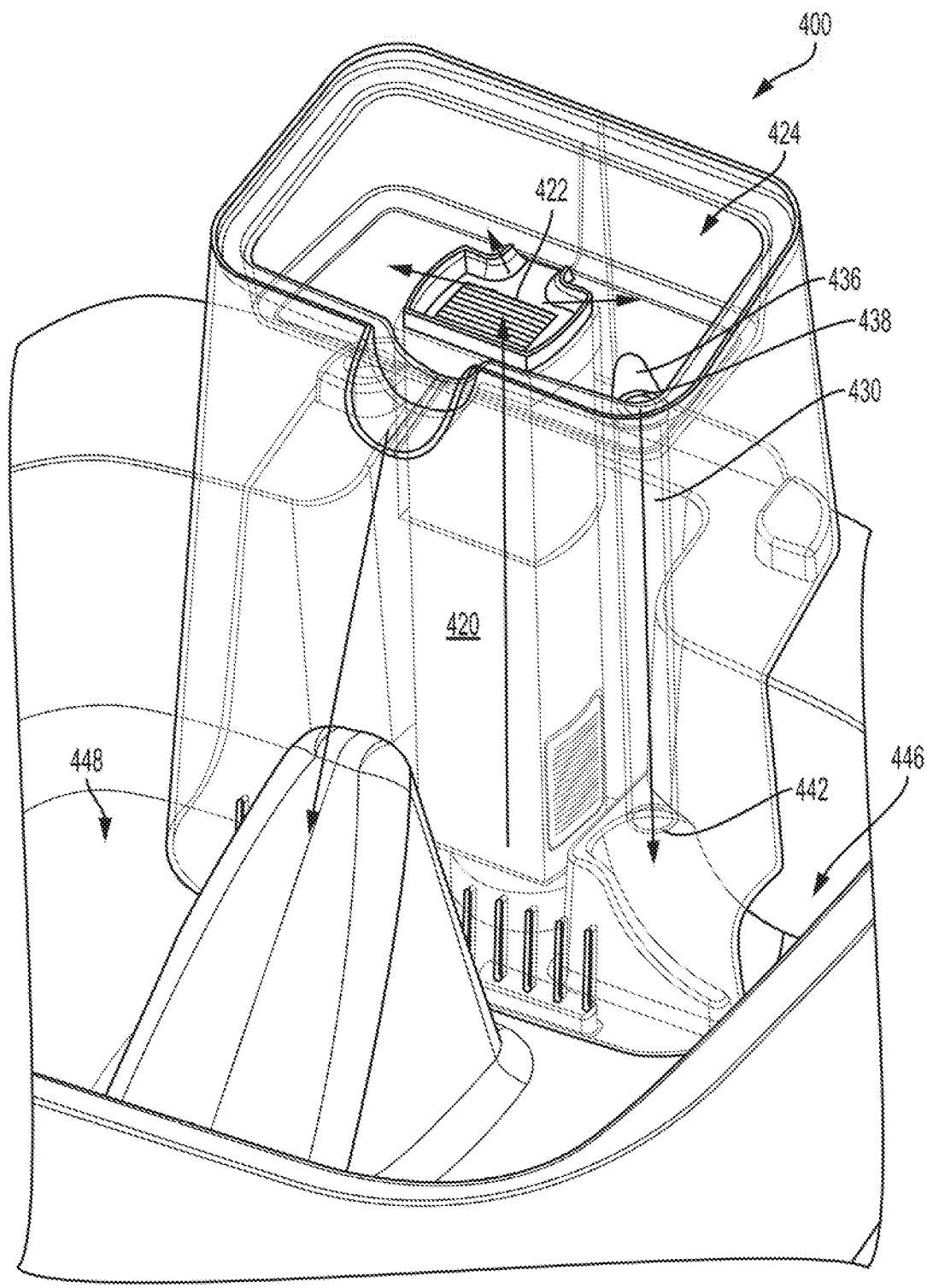
FIG. 8 is a perspective, cross-sectional view of an animal watering fountain in another preferred embodiment of the invention.
Figure 9:
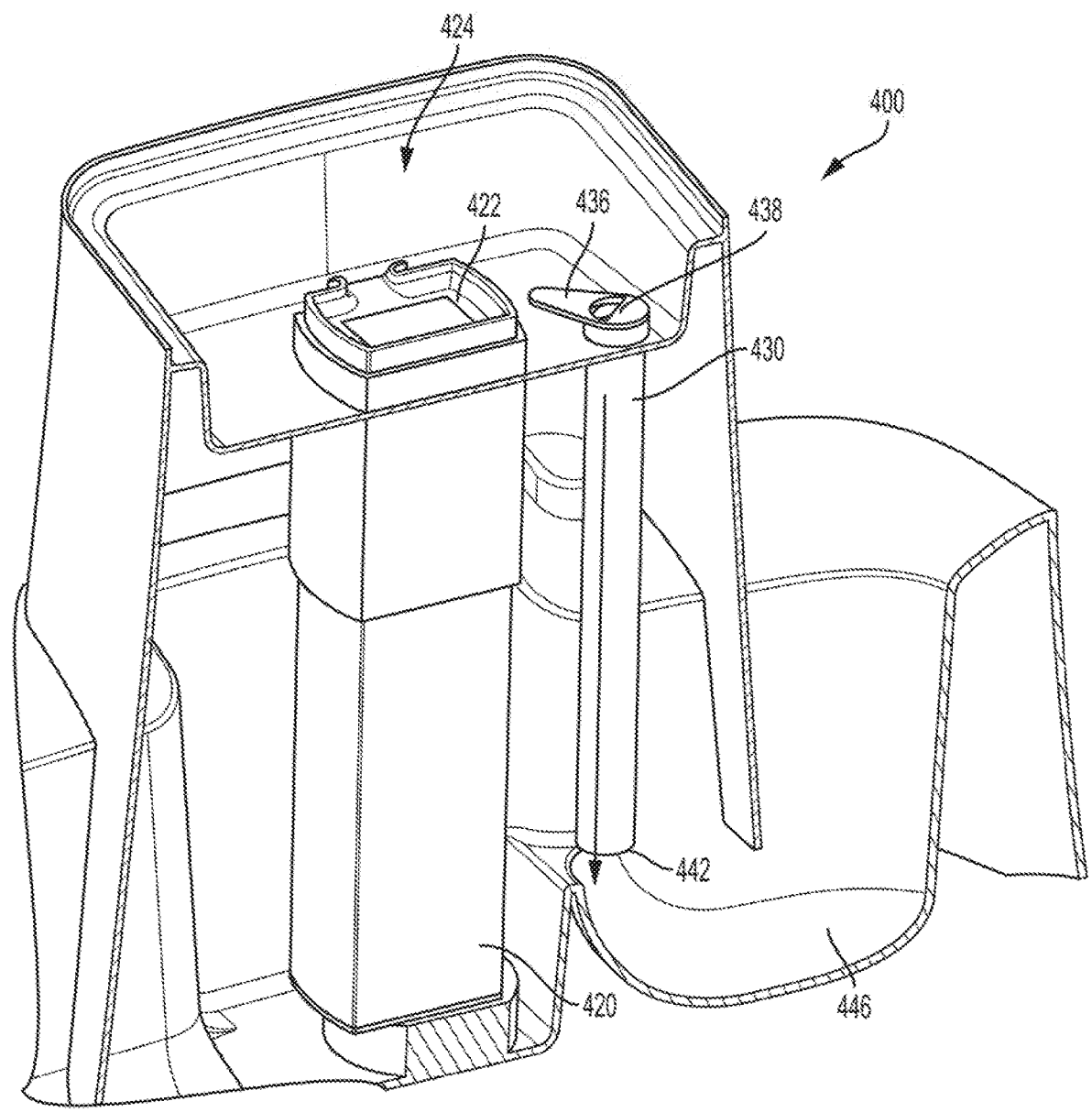
FIG. 9 is a perspective view of the animal watering fountain of FIG. 8, shown with portions shown in phantom for ease of explanation.

With reference next to FIGS. 8 and 9, there is shown an animal watering fountain 400 in another preferred form of the invention.

The construction is similar to that of the previous embodiment except for the design of the elements which control the flow of water subsequent to the pump 145. Here, the pump 145 is coupled to a lift pipe 420 having an exit 422 at an elevated reservoir 424.

A flow-control tube 430, which also constitutes the return tube, is in fluid communication with the reservoir 424. The flow-control tube 430 includes a flow knob 436 which is coupled to a flow control valve 438 to control the flow of water into and through the flow-control tube 430 through rotation of the knob 436 which controls the size of the opening into the flow-control tube 430. The flow-control tube 430 has an exit end 442 in fluid communication with an interior basin 446 of the bowl 110, the bowl also having a drinking basin 448.

In use, the pump 145 forces water from the interior basin 446 up the lift pipe 420 and into the reservoir 424. The water within the reservoir 424 may then enter the flow-control tube 430 where the water then flows through the flow-control tube 430 to the interior basin 446. Depending upon the position of the flow control valve 438 the water may be fully or partially prevented from entering the flow-control tube 430, wherein the water from the reservoir 424, or a portion thereof, will flow over spout opening 125 and back into the drinking basin 448. As such, again the water may take one of either, or both, water flow paths, one path being from the reservoir 424 to the drinking basin 448 and the other path being from the reservoir 424 back to the interior basin 446, as indicated by the arrows in FIGS. 8 and 9.

In addition the example embodiments can be easy to clean and maintain, such as by having parts which are easily removed or replaced. Indeed, certain embodiments include an easily removable debris filter, which may be a pre-filter that helps trap debris before water passes to the dispensing unit, additional filters, or both. It is possible to construct the detachable portions to include convenient slide-in or snap-on parts that can be easily removed, but which are secured against a base unit to prevent accidental removal by a pet.

An animal watering fountain for dispensing an aqueous drinking fluid of an embodiment comprises a bowl defining a wall for holding an aqueous drinking fluid, the bowl being divided into a drinking basin which is accessible to a domesticated pet, and an interior basin which is not accessible to the pet. The animal watering fountain also has a housing configured to cover the interior basin, the housing having an inlet port to receive water from the drinking basin. The animal watering fountain further includes a reservoir disposed above the bowl, the reservoir configured to hold a portion of the drinking fluid, a pump configured to receive the drinking fluid from the interior basin, and push the drinking fluid under pressure up to the reservoir, and a flow-control valve residing between the pump and the reservoir providing for control of return fluid flow, wherein the return fluid flow may be selectively directed to (i) the reservoir, (ii) the interior basin, or (iii) combinations thereof.

The animal watering fountain also comprises the flow-control valve wherein a pipe system has a lift pipe and a return pipe, the lift pipe being configured to direct drinking fluid from the interior basin up to the reservoir, and the return pipe being configured to direct drinking fluid back into the interior basin before it reaches the reservoir, and a flow-control tube residing within the lift pipe, the flow-control tube being movable between a completely closed position, wherein the entire volume of drinking fluid flows from the pump, through the lift pipe and up into the reservoir, a completely open position, wherein the entire flow of drinking fluid to the reservoir is turned, and is directed entirely through the return pipe to the interior basin, and one or more intermediate positions, wherein the total volume of drinking fluid that reaches the reservoir is reduced by directing a portion of the volume of drinking fluid through the return pipe and back into the interior basin.

The animal watering fountain also comprises (i) a first filter medium residing within the interior basin around the pump; (ii) a second filter medium residing adjacent the pump outlet; or (iii) both.

The animal watering fountain also comprises a flow-control valve in fluid communication with the reservoir providing for control of return fluid flow, wherein the return fluid flow may be selectively directed to (i) the drinking basin, (ii) the interior basin, or (iii) combinations thereof.

The animal watering fountain comprises the second filter medium having a first filtering stage made up of zinc alloy particles, and a second filtering stage representing granulated activated carbon particles or a single stage comprising of a mixture thereof.

The animal watering fountain also comprises the flow-control tube having a cylindrical body tube residing within the lift pipe, with the flow-control tube having an open region that extends across a portion of an inner circumference of the lift pipe; and a flow control knob residing at an upper end of the flow-control tube configured to allow a pet owner to rotate the tube within the lift pipe, wherein the flow-control tube assumes the open position when the open region is rotated into a position adjacent an inlet to the return pipe, and the flow-control tube assumes the closed position when the open region is rotated away from the inlet to the return pipe.

The animal watering fountain also comprises the open region of the flow-control tube having a tapered opening extending at an angle toward a bottom portion of the flow-control tube, defining the one or more intermediate positions configured to control the volume of drinking fluid that enters the return pipe.

The animal watering fountain also comprises the tapered opening of the flow-control tube being disposed vertically within the lift pipe such that the tapered opening is concentric with an inlet to the return pipe, and the flow-control valve is configured such that rotation of the flow-control tube causes more or less of the flow-control valve's opening to be disposed over the inlet to the return pipe, thereby regulating of the volume of drinking fluid that enters the return pipe.

The animal watering fountain also comprises a drinking fluid inlet configured to deliver drinking fluid from one or more tanks that reversibly attach to the watering fountain within the interior basin, and wherein the one or more tanks each comprise an end cap with a spring valve, and the interior basin further comprises an actuator arm that is configured to depress the end cap of the tank to allow drinking fluid to flow gravitationally into the interior basin when the tank is reversibly attached to the watering fountain.

The animal watering fountain also comprises the housing having a detachable cover that substantially covers the pump, a first grated wing that serves as an inlet port, a second grated wing that serves as an outlet port, and a cap that covers the pipe system and its flow-control tube.

The animal watering fountain also comprises the lift pipe comprising a y-tube that directs a first portion of the drinking fluid up to the reservoir, and a second portion of the drinking fluid back to the interior basin without a valve providing portion control.

The method of delivering water to an animal is also provided herein. The method generally includes providing a bowl. The bowl defines a wall and a basin for holding an aqueous drinking fluid such as water. The bowl is divided into a drinking basin and an interior basin.

The method also includes disposing a housing within the bowl. The housing covers at least a portion of the interior basin. However, the drinking basin is disposed outside of the housing.

The housing may comprise an inlet port and an outlet port. The two ports provide fluid communication between the interior basin and the drinking basin so that drinking fluid may be circulated around the basin.

The housing also holds a pump. The pump is configured to move water from the interior basin to a reservoir placed over the bowl. The reservoir is preferably integral to the housing.

The method further includes providing a reservoir above the bowl. The reservoir is configured to hold a portion of the drinking fluid. The reservoir has a lip arranged to deliver drinking fluid from the reservoir gravitationally into the drinking basin of the bowl at a splash location.

The method further includes placing aqueous drinking fluid into the interior basin of the bowl. Drinking fluid may further be placed directly into the reservoir. From there, the method includes activating the pump in order to cause drinking fluid to flow through pump outlet, into a lift pipe and up to the reservoir. From there, water pours over the spout and falls gravitationally down into the drinking basin.

The method additionally includes providing a pipe system. The pipe system includes a lift pipe and a return pipe. The lift pipe is configured to direct drinking fluid to the reservoir, while the return pipe is configured to direct drinking fluid back to the interior basin.

The method also comprises activating the pump. Activating the pump causes drinking fluid to flow through the lift pipe and into the reservoir such that drinking fluid flows over the lip and gravitationally falls down into the interior basin at the splash location.

The method further includes providing a cylindrical flow-control tube. The flow-control tube is rotatably disposed within the lift pipe, and serves as a water flow control valve. The flow-control tube may be manipulated by a flow-control knob that is disposed at the top of, and is integral to, the flow control tube. Manipulation of the flow control knob reduces or even stops the flow of drinking fluid that gravitationally falls into the drinking basin.

The method also comprises rotating the flow-control tube such that a volume of aqueous fluid is diverted from the lift pipe to the return pipe. This reduces the intensity of the aqueous fluid entering the reservoir.

In the method, manipulating the flow control knob may partially open or fully open the valve. In its open position, drinking fluid is directed to the return pipe, which circulates the fluid directly back to the interior basin.

The method may further include a step of providing a flow-control valve with a tapering edge that extends at an angle toward a bottom portion of the flow-control valve. This tapering edge defines the plurality of intermediate positions configured to control the volume of drinking fluid that enters the return pipe. To provide for the intermediate positions, the tapering edged of the flow-control valve is disposed vertically within the lift pipe such that the tapering edge is concentric with an inlet to the return pipe. Being so disposed, rotation of the flow-control tube causes more or less of the flow-control valve's open region to be disposed over the inlet to the return pipe. Therefore, when drinking fluid is pumped through the watering device, the volume of drinking fluid that enters the lift pipe is inversely proportional to the open region of the flow-control valve that is disposed over the inlet to the return pipe. In embodiments, method may include providing a flow-control valve with tapering edged such that the open region is substantially isosceles-triangle-shaped.

The method may additionally include providing a multistage filter disposed between the lift pipe and the pump.

Variations of the method for watering an animal may fall within the spirit of the claims, below. It will be appreciated that the inventions are susceptible to modification, variation, and change without departing from the spirit thereof.

I claim:

1. An animal watering fountain for dispensing an aqueous drinking fluid, comprising:
    a bowl defining a wall for holding an aqueous drinking fluid, the bowl being divided into a drinking basin which is accessible to a domesticated pet, and an interior basin which is not accessible to the pet;
    a housing configured to cover the interior basin, the housing having an inlet port to receive water from the drinking basin;
    a reservoir disposed above the bowl, the reservoir configured to hold a portion of the drinking fluid;
    a pump configured to receive the drinking fluid from the interior basin and push the drinking fluid under pressure up toward the reservoir, and
    a flow-control valve comprising a lift pipe, a return pipe, and a flow-control tube, wherein the lift pipe is configured to direct the drinking fluid from the interior basin up to the reservoir, wherein the return pipe is configured to direct the drinking fluid back into the interior basin before it reaches the reservoir, wherein the flow-control tube is rotatable to vary a flow distribution of the drinking fluid between the reservoir and the interior basin, the flow-control tube resides within the lift pipe, the flow-control tube being movable between:
        a completely closed position, wherein the entire flow of the drinking fluid flows from the pump, through the lift pipe and up into the reservoir;
        a completely open position, wherein the entire flow of the drinking fluid to the reservoir is turned, and is directed entirely through the return pipe to the interior basin; and
        one or more intermediate positions, wherein a total volume of the drinking fluid that reaches the reservoir is reduced by directing a portion of the volume of the drinking fluid through the return pipe and back into the interior basin.

2. The animal watering device of claim 1, further comprising:
    (i) a first filter medium residing within the interior basin around the pump;
    (ii) a second filter medium residing adjacent the pump outlet; or
    (iii) both.

3. The animal watering device of claim 2, wherein the second filter medium comprises a first filtering stage made up of zinc alloy particles, and a second filtering stage representing granulated activated carbon particles.

4. The animal watering fountain of claim 1, wherein:
    the flow-control tube comprises a cylindrical body tube residing within the lift pipe, with the flow-control tube having an open region that extends across a portion of an inner circumference of the lift pipe; and
    a flow control knob residing at an upper end of the flow-control tube configured to allow a pet owner to rotate the tube within the lift pipe;
    and wherein the flow-control tube assumes the open position when the open region is rotated into a position adjacent an inlet to the return pipe, and the flow-control tube assumes the closed position when the open region is rotated away from the inlet to the return pipe.

5. The animal watering fountain of claim 4, wherein:
    the open region of the flow-control tube comprises a tapered opening extending at an angle toward a bottom portion of the flow-control tube, defining the one or more intermediate positions configured to control the volume of the drinking fluid that enters the return pipe.

6. The animal watering fountain of claim 5, wherein:
    the tapered opening of the flow-control tube is disposed vertically within the lift pipe such that the tapered opening is concentric with an inlet to the return pipe; and
    the flow-control valve is configured such that rotation of the flow-control tube causes more or less of the flow-control valve's opening to be disposed over the inlet to the return pipe, thereby regulating a volume of drinking fluid that enters the return pipe.

7. The animal watering fountain of claim 1, further comprising:
    a drinking fluid inlet configured to deliver drinking fluid from one or more tanks that reversibly attach to the watering fountain within the interior basin; and
    wherein:
        the one or more tanks each comprise an end cap with a spring valve; and
        the interior basin further comprises an actuator arm that is configured to depress the end cap of the tank to allow drinking fluid to flow gravitationally into the interior basin when the tank is reversibly attached to the watering fountain.

8. The animal watering fountain of claim 1, wherein the housing comprises:
    a detachable cover that substantially covers the pump;
    a first grated wing that serves as an inlet port;
    a second grated wing that serves as an outlet port; and
    a cap that covers the pipe system and its flow-control tube.

9. The animal watering fountain of claim 8, wherein:
    the lift pipe comprises ay-tube that directs a first portion of the drinking fluid up to the reservoir, and a second portion of the drinking fluid back to the interior basin without a valve providing portion control.

10. An animal watering fountain for dispensing an aqueous drinking fluid, comprising:
    a bowl having a drinking portion and an interior portion;
    a housing at least partially covering the interior portion;
    a reservoir in fluid communication with the bowl;
    a liquid pump in fluid communication with the bowl and the reservoir; and
    a flow-control valve in fluid communication with the liquid pump for selectively controlling a flow distribution of the drinking fluid between a first path through the reservoir to the drinking portion and a second path back to the bowl, wherein the flow-control valve includes a first pipe extending from the liquid pump to the reservoir and a second pipe extending from the first pipe to the bowl, the flow-control valve having a variable opening the selective position of which determines the flow distribution between the first path and the second path, the flow-control valve comprises a body tube residing within the first pipe, with the body tube having an open region that extends across a portion of an inner circumference of the first pipe; and wherein the body tube assumes the open position when the open region is rotated into a position adjacent an inlet of the second pipe, and the body tube assumes the closed position when the open region is rotated away from the inlet of the second pipe.

11. The animal watering fountain of claim 10, wherein:
the open region of the body tube comprises a tapered opening extending at an angle toward a bottom portion of the body tube, defining the one or more intermediate positions configured to control the volume of drinking fluid that enters the second pipe.

12. The animal watering fountain of claim 11, wherein:
the tapered opening of the body tube is disposed vertically within the first pipe such that the tapered opening is concentric with the inlet of the second pipe; and the flow-control valve is configured such that rotation of the body tube causes more or less of the flow-control valve's opening to be disposed over the inlet of the second pipe, thereby regulating of a volume of drinking fluid that enters the second pipe.

13. An animal watering fountain for dispensing an aqueous drinking fluid, comprising:
- a bowl defining a wall for holding an aqueous drinking fluid, the bowl being divided into a drinking basin which is accessible to a domesticated pet, and an interior basin which is not accessible to the pet;
- a housing configured to cover the interior basin, the housing having an inlet port to receive the drinking fluid from the drinking basin;
- a reservoir disposed above the bowl, the reservoir configured to hold a portion of the drinking fluid;
- a pump configured to receive the drinking fluid from the interior basin and force the drinking fluid under pressure up toward the reservoir; and
- a flow-control valve comprising a lift pipe and a return pipe, the lift pipe being configured to direct the drinking fluid from the interior basin up to the reservoir, and the return pipe being configured to direct the drinking fluid back into the interior basin before it reaches the reservoir, wherein the flow control valve includes an opening configurable to vary a flow distribution of the drinking fluid between the reservoir and the interior basin, the flow-control valve is movable between a completely closed position, wherein the entire flow of the drinking fluid flows from the pump, through the lift pipe, up into the reservoir, and into the drinking basin;

a completely open position, wherein the entire flow of the drinking fluid is directed through the return tube and into the interior basin; and one or more intermediate positions, wherein a total volume of drinking fluid from the reservoir is reduced by directing a portion of the volume of the drinking fluid through the return tube and back into the interior basin.

* * * * *